US008436715B2

(12) United States Patent
Elgort et al.

(10) Patent No.: US 8,436,715 B2
(45) Date of Patent: May 7, 2013

(54) SYSTEM AND METHOD FOR DISPLAYING AND MANAGING ELECTRONIC MENUS

(75) Inventors: Daniel R. Elgort, New York, NY (US); Scott T. Denegre, New York, NY (US); Shanon V. Levenherz, New York, NY (US)

(73) Assignees: Daniel R. Elgort, New York, NY (US); Scott T. Denegre, New York, NY (US); Shanon V. Levenherz, New York, NY (US)

( * ) Notice: Subject to any disclaimer, the term of this patent is extended or adjusted under 35 U.S.C. 154(b) by 808 days.

(21) Appl. No.: 12/485,620

(22) Filed: Jun. 16, 2009

(65) Prior Publication Data

US 2009/0309748 A1   Dec. 17, 2009

Related U.S. Application Data

(60) Provisional application No. 61/073,253, filed on Jun. 17, 2008.

(51) Int. Cl.
*H04Q 5/22* (2006.01)

(52) U.S. Cl.
USPC ............... 340/10.1; 705/14.64; 705/14.58; 705/14.67; 705/14.72; 705/15; 455/550.1; 455/566; 345/902

(58) Field of Classification Search ............... 340/10.1
See application file for complete search history.

(56) References Cited

U.S. PATENT DOCUMENTS

| | | | |
|---|---|---|---|
| 5,235,509 A | 8/1993 | Mueller et al. | |
| 5,845,263 A | 12/1998 | Camaisa et al. | |
| 6,208,976 B1 | 3/2001 | Kinebuchi et al. | |
| 6,341,268 B2 | 1/2002 | Walker et al. | |
| 6,384,850 B1 | 5/2002 | McNally et al. | |
| 6,473,739 B1 | 10/2002 | Showghi et al. | |
| 6,646,659 B1 | 11/2003 | Brown et al. | |
| 6,681,109 B1 | 1/2004 | Leifer | |

(Continued)

*Primary Examiner* — George Bugg
*Assistant Examiner* — Anthony D Afrifa-Kyei
(74) *Attorney, Agent, or Firm* — Norris McLaughlin & Marcus, P.A.

(57) ABSTRACT

Systems and methods display and manage wireless electronic menus that are capable of connecting to a computer terminal, a server and/or a database via one or more communication networks. The systems are capable of managing wireless electronic menus within a single site establishment or within multi-site establishments The menus have one or more sensors for determining if the menus are in motion, idle, in use not in use or docked to a charging base to define a menu status for each menu. The terminal updates the menu content of the menus based on the menu status of each menu. A proximity sensor determines a location of the menus to define a configuration of the menus with respect a table or a table configuration of tables on a floor plan. Sensors, a user input and/or the computer terminal associate the menus with a menu grouping or with the table in close proximity of the menus so that common menu content may be display by each menu. The menus display menu content for available goods and/or services offered by a provider in one or more languages as selected by users of the menus. Usage of menus is accurately tracked by the proximity sensor and the sensors of the menus to eliminate false counts and to correct for errors generated by multiple uses of the menu by multiple users. The menus provide lists of goods and/or services in a format which is capable of being sorted and/or filtered based on the information and/or multimedia data indicative of the goods and/or services.

20 Claims, 7 Drawing Sheets

U.S. PATENT DOCUMENTS

| | | |
|---|---|---|
| 6,859,215 B1 | 2/2005 | Brown et al. |
| 6,865,261 B1 | 3/2005 | Rao et al. |
| 6,871,325 B1 | 3/2005 | McNally et al. |
| 6,873,970 B2 | 3/2005 | Showghi et al. |
| 7,110,964 B2 | 9/2006 | Tengler et al. |
| 7,257,547 B1 | 8/2007 | Terase |
| 2001/0047301 A1 | 11/2001 | Walker et al. |
| 2002/0026364 A1 | 2/2002 | Mayer et al. |
| 2003/0120561 A1 | 6/2003 | Asada |
| 2003/0154089 A1 | 8/2003 | Sone |
| 2004/0034564 A1 | 2/2004 | Liu |
| 2004/0054592 A1 | 3/2004 | Hernblad |
| 2004/0143503 A1* | 7/2004 | Suthar .................. 705/15 |
| 2004/0158494 A1 | 8/2004 | Suthar |
| 2005/0065851 A1 | 3/2005 | Aronoff et al. |
| 2005/0171850 A1 | 8/2005 | Yueh |
| 2005/0182680 A1 | 8/2005 | Jones, III et al. |
| 2006/0085265 A1 | 4/2006 | Dietz et al. |
| 2006/0186197 A1* | 8/2006 | Rosenberg ............ 235/380 |
| 2006/0235755 A1 | 10/2006 | Mueller et al. |
| 2006/0255128 A1 | 11/2006 | Johnson et al. |
| 2007/0061209 A1 | 3/2007 | Jackson |
| 2007/0130017 A1 | 6/2007 | Torres et al. |

* cited by examiner

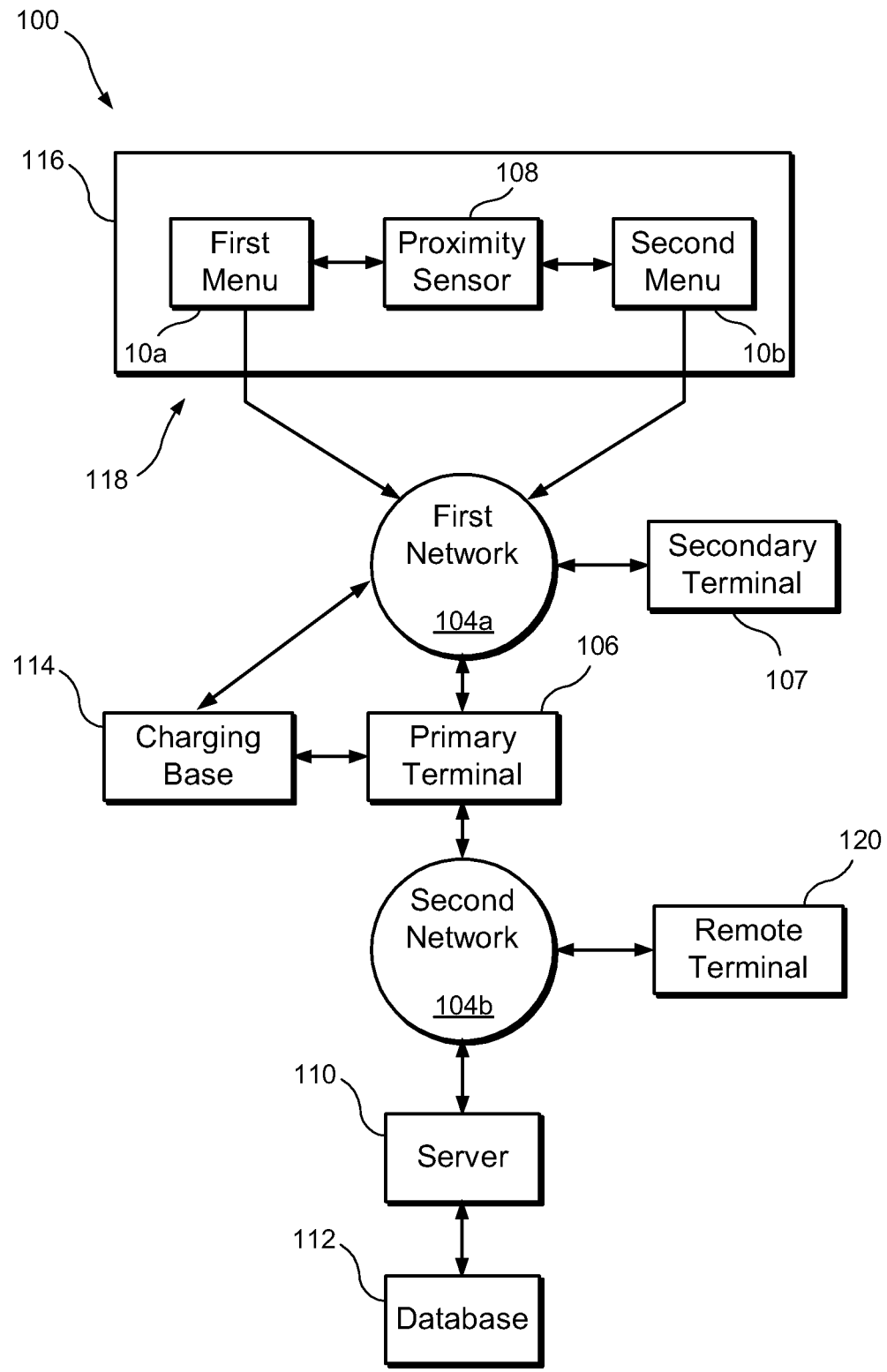
F I G. 2

SYSTEM AND METHOD FOR DISPLAYING AND MANAGING ELECTRONIC MENUS

CROSS REFERENCE TO RELATED APPLICATION

This application claims the benefit of U.S. Provisional Application No. 61/073,253 filed Jun. 17, 2008, incorporated by reference herein.

BACKGROUND

The present disclosure is related to systems and methods for displaying and managing electronic menus. More specifically, the systems and methods for displaying and managing electronic menus may include one or more wireless electronic menus capable of connecting to a wireless communication network and/or a provider computer terminal. The one or more electronic menus may have one or more sensors and/or one or more communication means for communicating with each other, a server, a database and/or the provider computer terminal. The electronic menus and the provider computer terminal may be programmed with software for updating and/or reconfiguring the information displayable by the electronic menus via the provider computer terminal in real-time over the wireless communication network. The electronic menus may display information or multimedia data indicative of goods and/or services associated with a provider menu, such as, for example, a restaurant menu, a hospitality menu, an entertainment menu and/or the like. Users of the electronic menus may access the information and/or multimedia data indicative of one or more goods and/or services and may order the goods and/or services associated with the displayed information and/or multimedia. An audio output device and/or a display of the electronic menus may provide multi-linguistic texts, audio and video to users for the information and multimedia data indicative of the goods and/or services. Additionally, the users of the handheld electronic menus may access a history of orders for a duration of time or a session and/or orders made by a menu grouping However, the systems and methods disclosed herein are not restricted to restaurant, hospitality and entertainment menus and may be utilized to identify and order any desired goods and/or services to a user interacting with the electronic menus.

The systems and methods for displaying and managing the electronic menus may accurately track usage of an electronic menu by eliminating false counts and correcting for errors when the electronic menu is accessed more than one time by more than one user. The electronic menus may be associated with a group of users such that the electronic menus may display common menu content associated with the group or selected by a member of the group to each user in the group. For example, all members of a dinner party at a restaurant may access and view selections made by other members of the dinner party or a patron of a hotel, such as a parent may view a guest folio including spa, game room, bar restaurant or poolside purchases for other member of their party, such as, children. The systems and methods for displaying and managing the electronic menus may update the electronic menus based on a determination of an updatable state of the electronic menus. The updatable state of the electronic menus may enable or prevent one or more types of content updating for the electronic menus. Examples of the updatable state may include, but are not limited to, when the electronic menus are not in use, i.e., currently grouped or actively being used. The systems and methods for displaying and managing the electronic menus may provide a dynamic determination of a layout of a room of a provider based on the communication means and the sensors of the electronic menus and/or proximity sensors within the room. Advertising media may be displayed by the electronic menus, the provider computer terminal or by a remote computer terminal accessible by remote users.

It is generally known, for example, that a restaurant, hospitality and/or entertainment establishment (hereinafter "establishment") provides a patron with a preprinted paper menu displaying printed text that describes goods and services available for purchase from the establishment. If the patron has inquires regarding the goods and services, the patron addresses the inquires with an employee of the establishment. Thus, addressing several different inquires of the patron before the patron determines which goods and services are desired may be time consuming and may prolong the duration of time before the goods and services are rendered to the patron.

Traditionally, the goods and services offered by the establishment may be sold out or no longer offered based on time restraints, inventory, business hours and/or the like. However, the preprinted paper menu of the establishments still include these goods and services which are no longer offered because the preprinted paper menus were prepared when the goods and services were available. In order to update the preprinted paper menu, the establishment must modify a digital version of the menu to update available goods and services. After updating the digital version of the menu, the paper menus must be reprinted and distributed to the patron. Alternatively, the establishment may utilize a custom print shop to update the preprinted paper menus. As a result, updated preprinted paper menus must be shipped from the custom print shop and delivered to the establishment distributing them to the patrons. Thus, updating and reprinting paper menus to accurately reflect the available goods and services of the establishment is a timely and costly procedure.

Additionally, there is generally a substantial amount of economic overhead associated with maintaining different versions of the printed menus for providing to the patrons of the establishment, For example, an establishment may realize significant costs associated with maintain different versions of the printed menus, such as, for example, lunch menus, dinner menus, specials feature menus, dessert menus, drinks and/or wine menus, late night menus, brunch menus, seasonal menus and/or the like.

Further, it is generally known, that an establishment hosts one or more groups of patrons. In most instances, each group of patrons may require a specific menu that is directed to goods and services indicative of the patrons of the group or the group itself. In any case, the establishment must update, modify and/or reconfigure the digital version of the menu to include the goods and services specific to each group and then print paper menus for distribution to the group. Moreover, if the paper menus for a group are printed and subsequent modifications are required, the paper menus must be reprinted at an additional cost to the establishment. Thus, preparing and/or modifying paper menus that are specific to one or more groups of patrons are also a costly and timely procedure.

Moreover, it is generally known, that in an effort to streamline ordering of goods and services by patrons of the establishment, the employee may be equipped with and may utilize a wireless device connected to a wireless communication network, such as, for example, a personal digital assistant (hereinafter "PDA") to take orders for desired goods and services from one or more patrons. The establishment provides the employee with the wireless device so that the employee does not have to take the order by simultaneously writing the orders on, for example, a piece of paper and then subsequently entering the orders at a remote point of sale (POS) terminal and/or the like. In an effort to increase employee productivity and efficiency and decrease error occurrences by the employee submitting the orders, the employee enters the orders of the patrons in to the wireless device immediately after the patron places the order with the employee. However, the employee is still required to spend time entering the orders of the patrons into the wireless device because the patrons do not have access to manipulate and utilize the wireless device themselves. Additionally, the employee is still required to answer inquires from the patrons because the patrons may not have access to additional information regarding the available goods and service offered by the establishment. Thus, the employee may be incapable of answering the inquires from the patrons without the aid of the wireless device.

A need, therefore, exists for systems and methods for displaying and managing electronic menus which may allow patrons of an establishment to have inquires regarding goods and/or services answered with information provided by the electronic menus. Additionally, a need exists for systems and methods for displaying and managing electronic menus which may update, modify and/or configure information displayable by the electronic menus in real-time over a wireless network. Further, a need exists for systems and methods for displaying and managing electronic menus which may provide sensors and/or communication means for the electronic menus to determine locations of the electronic menus, a patron utilizing the electronic menus or a group formed by the patrons utilizing the electronic menus. Still further, a need exists for systems and methods for displaying and managing electronic menus which may perform a dynamic determination of a layout from a set of predetermined layouts, such as table configuration based on locations of the electronic menus in a room of the establishment that may be detectable with one or more sensors of the electronic menus. Yet still further, a need exists for systems and methods for displaying and managing electronic menus which may provide information and/or multimedia data indicative of goods and/or services in more than one language as selected by users of the electronic menus. Moreover, a need exists for systems and methods for displaying and managing electronic menus which may prevent environmental pollution damage by reducing an amount of paper used for printed menus and/an amount of natural resources used for transporting and packaging printed menus for distribution to more than one establishment. Furthermore, a need exists for systems and methods for displaying and managing electronic menus which may minimize loss of goodwill by patrons that may result from a patron ordering a good or service that is no longer available.

SUMMARY

Systems and methods may display and manage electronic menus which may have one or more wireless electronic menus (hereinafter "menus") capable of connecting to a provider computer terminal, a server and/or a database via one or more communication networks. The menus may have one or more communication means for communicating with each other and a sensor and/or for connecting to the communication networks. The menus may have one or more sensors for determining if the menus are in motion, idle, in use, not in use or docked to a charging base for defining a menu status for each menus. The terminal may update the menu content of the menus based on an updatable state of the menus including, but not limited to the menu status of each menus. A proximity sensor may determine a location of the menus in a room to define a configuration of the menus with respect a table or a table configuration of tables with respect to a floor plan. Additionally, the proximity sensor and the provider computer terminal may associate the menus with a menu grouping or with the table which may be in a close proximity of the menus such that common menu content may be displayed by each menu in the menu grouping. The menus may display menu content for goods and/or services offered by a provider, and users may order desired goods and/or services with the menus. Usage of menus may be accurately tracked by the proximity sensor and the sensors of the menus to eliminate false counts and to correct for errors that may be generated by multiple uses of the menus by multiple users. Advertising media may be rendered or displayed via the menus, the provider computer terminal or a remote computer terminal of a remote user.

In embodiments of the present invention, a system for displaying and managing wireless electronic menus is provided. The system may have a first computer terminal connected to a first communication network, wherein the first communication network is a wireless communication network. Moreover, the system may have a first electronic menu having a display, a memory, a first wireless transducer and a first sensor connected to a microprocessor, wherein the first electronic menu renders information and/or multimedia data via the display, wherein the first wireless transducer is connected to the first wireless communication network such that the first electronic menu communicates with the first computer terminal via the first communication network, wherein the first electronic menu is located at a position that is an open position or a closed position, wherein the first sensor detects the position of the menu and transmits the position of the menu to the first computer terminal via the first communication network.

In embodiments, the system may have a second electronic menu having a display, a memory, a first wireless transducer and a first sensor connected to a microprocessor, wherein the first wireless transducer of the second electronic menu is connected to the first wireless communication network such that the second electronic menu communicates with the first computer terminal via the first communication network, wherein the second electronic menu is located at a position that is an open position or a closed position, wherein the first sensor of the second electronic menu detects the position of the second electronic menu and transmits the position of the second electronic menu to the first computer terminal via the first communication network.

In embodiments, the system may have a proximity sensor connected to the first communication network, wherein the proximity sensor detects a location of the first electronic menu and/or the second electronic menu.

In embodiments, the system may have a second wireless transducer connected to the microprocessor of the first electronic menu, wherein the second wireless transducer communicates with the proximity sensor.

In embodiments, the second wireless transducer or the proximity sensor may be an infrared communication device, a radio frequency identification tag, radio frequency identification reader, a Smart Card, a Smart Card reader, a ultrasonic position sensor, an optical position sensor or an electromagnetic sensor.

In embodiments, the system may have a server and a database in communication with the first computer terminal via a second communication network.

In embodiments, the system may have advertising media stored in the database, wherein the advertising media is rendered by the first electronic menu or the first computer terminal.

In embodiments, the system may have a second computer terminal remote with respect to the first computer terminal and in communication with the first computer terminal or the database via the second communication network, wherein the advertising media is rendered by the second computer terminal.

In embodiments, the first electronic menu may have a second sensor connected to the microprocessor, wherein the second sensor detects a movement of the first electronic menu from a first location to a second location.

In embodiments, the first electronic menu may have a third sensor connected to the microprocessor of the first electronic menu, wherein the third sensor is a touch sensor, a thermal sensor, or a pressure sensor.

In embodiments, the first electronic menu has a card authorization system connected to the microprocessor of the first electronic menu.

In embodiments, the display of the first electronic menu may be an ultra-thin liquid crystal display, a passive liquid crystal display, a flexible or a rigid organic light emitting diode, light emitting polymer or organic electro-luminescence, electronic paper, a surface-conduction electron-emitter display, a field emission display or an electrochromic display.

In embodiments, the first sensor of the first electronic menu may be a photo-sensor or a switch.

In embodiments, the second sensor of the first electronic menu may be an optical sensor, an infrared sensor, a level sensor, a gyroscope sensor, a microphone, a photoelectric sensor, a photoswitch, an inclinometer, an infrared thermometer, or an accelerometer.

In embodiments, the information and/or multimedia data may be menu information indicative of menu items, food ratings and reviews, nutritional information including calories and fat content, wine descriptions and pairings, suggestive selling, upgrades or add-ons, wine-maker features, staff tasting notes, a preparation style or procedure of the menu items, a preparing status of the menu items, promotional information, one or more cooking materials, a flavor of the menu items, nutrition ingredients of the menu items and/or health effects or allergic reactions associated with consumption of the menu items.

In another embodiment of the present invention, a method for displaying and managing wireless electronic menus is provided. The wireless electronic menus may be located in a room of a goods or services provider, wherein the room has one or more tables for receiving guests. The method may include a step of providing a first electronic menu having a display, a memory, a first wireless transducer and a first sensor connected to a microprocessor, wherein the first electronic menu renders information and/or multimedia data indicative of menu items via the display. Further, the method may include a step of connecting the first wireless transducer of the first electronic menu to a wireless communication network, wherein a first computer terminal is connected to the wireless communication network such that the first electronic menu communicates with the first computer terminal via the first communication network. Moreover, the method may include a step of detecting a location of the first electronic menu via a proximity sensor, wherein the proximity sensor is in communication with the first electronic menu.

In embodiments, the first electronic menu may be located at an open position or a closed position, wherein the first sensor of the first electronic menu detects a position or movement of the menu.

In embodiments, the method may include a step of determining if the first electronic menu is associated with a table based on proximity of the detected location of the first electronic menu with respect to the table.

In embodiments, the method may include a step of detecting a location of a second electronic menu with respect to the table and associating the second electronic menu with the table based on proximity of the detected location of the second electronic menu with respect to the table.

In embodiments, the method may include a step of determining a configuration of the table based on the detected locations of the first and second electronic menus.

In embodiments, the method may include a step of grouping the first and second electronic menus together to form a new menu grouping based on the association of the first and second electronic menus with table or based on acceleration data for the first and second electronic menus.

In embodiments, the method may include a step of providing common menu information to each electronic menu of the new menu grouping.

In embodiments, the method may include a step of rendering the information and/or multimedia data in multiple languages.

In embodiments, the method may include a step of rendering advertising media via the first electronic menu or the first computer terminal.

In embodiments, the method may include a step of selecting a menu item and rendering the information and/or multimedia data indicative of the selected menu item via the first electronic menu.

In embodiments, the method may include a step of ordering the selected menu item via the first electronic menu.

In embodiments, the method may include steps of detecting a movement of the first electronic menu in one direction within a first predetermined period of time for a predetermined distance or for a second predetermined period of time via a second sensor of the first electronic menu and registering no new usage or a new usage of the first electronic menu based on the detected position or movement of the first menu after the detected movement of the first electronic menu, wherein a registration of a new usage increases the usage count for the first electronic menu.

In embodiments, the method may include a step of registering a new usage of the first electronic menu if a subsequent new usage of the first electronic menu has not been registered within the first predetermined period of time.

In embodiments, the method may include a step of determining if the first electronic menu is idle for at least a first predetermined period of time, wherein a grouping status of the first electronic menu is not changed if the first electronic menu is not idle for at least the first predetermined period of time.

In embodiments, the method may include a step of determining if the first electronic menu has been in contact with a second electronic menu for more than a second predetermined period of time, wherein the grouping status of the first menu is changed if the first electronic menu has been in contact with the second menu for more than the second predetermined period of time.

In embodiments, the method may include a step of determining if the first electronic menu has been associated with the table for more than the second predetermined period of time, wherein the grouping status of the first electronic menu is changed if the first electronic menu has been associated with the table for more than the fourth predetermined period of time.

In embodiments, the first electronic menu may be updated if the first electronic menu is in an updatable state.

In embodiments, the method may include a step of determining if a usage count for the first electronic menu has increased within a third predetermined period of time, wherein the first electronic menu is not updated if the usage count of the first electronic menu has increased within the third predetermined period of time.

In embodiments, the method may include a step of determining if the first electronic menu is a member of a menu grouping, wherein the first electronic menu is not updated if the first electronic menu is a member of the menu grouping.

In embodiments, the first electronic menu may not be updated if the first electronic menu is associated with the table and the second electronic menu.

In embodiments, the method may include a step of increasing the usage count for the first electronic menu based on the position or movement of the first electronic menu detected by the first sensor after the first electronic menu has been associated with the table.

In embodiments, the method may include a step of determining if the first electronic menu is in use or not in use based on the association of the first electronic menu with the first table and the detected position or movement of the first electronic menu.

In embodiments, the method may include a step of updating the information and/or multimedia data stored in the first electronic menu when the first electronic menu is determined to not be in use.

In embodiments, the method may include a step of connecting a second computer terminal to the first computer terminal via a second communication network In embodiments, the method may include a step of creating a user profile via the first electronic menu, the first computer terminal, the second computer terminal and storing the user profile with the first computer terminal.

In embodiments, the method may include a step of transmitting a notification or advertising media to the first computer terminal, the second computer terminal or the first electronic menu based on information from the user profile.

In embodiments, the method may include a step of determining if a new menu grouping is established by the first and second electronic menus based on proximity of the first menu with respect to the table or the second electronic menu, wherein a floor configuration is not updated if the new menu grouping is not established.

In embodiments, the method may include a step of identifying information indicative of the new menu grouping, wherein the floor configuration is updated if the information indicative of the new menu grouping allows a current active layout to be matched with a layout template.

In embodiments, the method may include a step of requesting confirmation or rejection of a new table layout for including the new menu grouping, wherein the floor configuration is updated with confirmation or rejection of the new table layout via the first computer terminal It is, therefore, an advantage of the present disclosure to provide systems and methods for displaying and managing electronic menus that may increase quality and convenience of goods and service rendered by a provider and may decrease an amount of time for delivery of the goods and services to the user.

Another advantage of the present disclosure is to provide systems and methods for displaying and managing electronic menus which may increase revenues, sales and productivity of a provider by providing information regarding goods and services to users via the electronic menus.

And, another advantage of the present disclosure is to provide systems and methods for displaying and managing electronic menus which may increase efficiency, reliability and consistency of goods and services rendered by a provider while minimizing labor costs and waste of goods and/or shipping costs or vendor costs associated with preprinted paper menus prepared by a custom print shop.

A further advantage of the present disclosure is to provide systems and methods for displaying and managing electronic menus which may include light-weight and thin wireless devices having one or more sensors for communication with each other and one or more communication networks.

Moreover, an advantage of the present disclosure is to provide systems and methods for displaying and managing electronic menus which may accurately identify a usage count for the electronic menus by one or more users.

And, another advantage of the present disclosure is to provide systems and methods for displaying and managing electronic menus which may render advertising media via the electronic menus, a provider computer terminal or a remote computer terminal of a remote user.

Yet another advantage of the present disclosure is to provide systems and methods for displaying and managing electronic menus which may prepare, update, and/or configure the electronic menus in real-time over a wireless computer network.

Another advantage of the present disclosure is to provide systems and methods for displaying and managing electronic menus which may have one or more sensors to identify locations of the electronic menus with respect to a floor plan of a provider.

A still further advantage of the present disclosure is to provide systems and methods for displaying and managing electronic menus which may identify a group of one or more electronic menus to display common menu content on each electronic menu of the group.

Additional features and advantages of the present disclosure are described in, and will be apparent from, the detailed description of the presently preferred embodiments and from the drawings.

BRIEF DESCRIPTION OF THE DRAWINGS

FIG. 2 illustrates a block diagram of a system for displaying and managing electronic menus in accordance with the present disclosure;

EMBODIMENTS

The present disclosure generally relates to systems and methods which may display and manage wireless electronic menus (hereinafter "menus"). The menus may be capable of connecting to a provider computer terminal, a server and/or a database via communication networks. The menus may have one or more sensors for determining if the menus are in motion, idle, in use, not in use or docked to a charging base for defining a menu status for each menu. The provider computer terminal may refresh the menu content of each menu based on an updatable state of each menu including, but not limited to the menu status of the menu. A proximity sensor may determine a location of the menu in a room of a provider for defining a configuration of the menus with respect a table or a table configuration of tables on a floor plan of the room. The proximity sensor and the provider computer terminal may associate the menus with a menu grouping or with the table in close proximity of the menus so that common menu content may be displayed by each menu. The menus may display menu content for goods and/or services offered by a provider, and users may order desired goods and/or services with the menus. Additionally, the users of the handheld electronic menus may provide "log in" functionality such that the users may access a history of orders or purchases at, for example, a bar or restaurant for a duration of time or a session and/or made by members a menu grouping. Usage of menus may be accurately tracked by the proximity sensor and the sensors of the menus.

In embodiments, the provider may refer to a party or business which may provide the one or more goods and/or services to patron of the provider, such as, for example, a user. The provider may be a hospitality business, such as, for example, a hotel, a restaurant, a casino, a resort, a club and/or the like. In embodiments, the provider may be a leisure or entertainment business that may provide one or more entertainment service to the user. It should be understood that the provider may be any provider that delivers one or more goods or renders one or more services to the user as known to one of ordinary skill in the art.

Figure 1A:
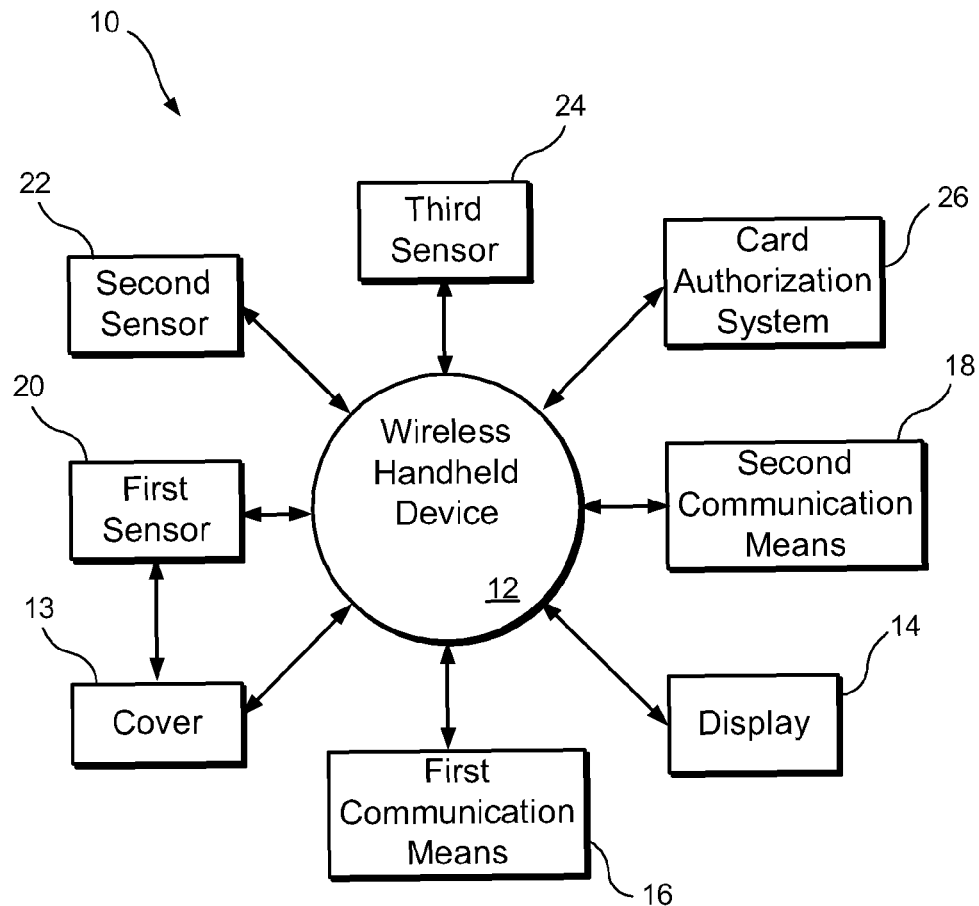
FIG. 1A illustrates a block diagram of an electronic menu system in accordance with the present disclosure.

Referring now to the drawings wherein like numerals refer to like parts, FIG. 1A shows an electronic menu system 10 (hereinafter "menu 10") having a wireless device 12 (hereinafter "device 12") with a cover 13. The cover 13 may be similar to, for example, a book cover and may be moved from an open position to a closed position. With the cover 13 in the open position, the device 12 may be uncovered and accessible by a patron, such as, a user (not shown in the drawings). With the cover 13 in the closed position, the device 12 may be covered and enclosed within the cover 13 to protect the device 12 from being damaged by moisture, external forces or pressures and/or like. The cover 13 may be made from a material, such as, for example, leather, synthetic leather, polyethylene, polypropylene, rubber and/or the like. It should be understood that the material of cover 13 may be any material that is capable of protecting the device 12 from damage or destruction when the cover 13 is in a closed position as known to one of ordinary skill in the art.

In embodiments, the device 12 may be a light-weight and ultra-thin wireless electronic media device, such as, for example, a tablet personal computer (hereinafter "PC"), an ultra-mobile PC, a mobile-based pocket PC, an electronic book computer, a laptop computer, a media player, a portable media device, a PDA, an enterprise digital assistant and/or the like. In embodiments, the device 12 may be, for example, a 4G mobile device, a 3G mobile device, an ALL-IP electronic device, an information appliance or a personal communicator. The present disclosure should not be deemed as limited to a specific embodiment of the device 12.

The device 12 may have a display 14 for displaying or rendering information and/or multimedia data stored in a memory (not shown in drawings) of the device 12. In embodiments, the display 14 may be, for example, an ultra-thin liquid crystal display (hereinafter "LCD"), a passive LCD, a flexible organic light emitting diode, an organic light emitting diode, a light emitting polymer display an organic electro-luminescence display, an electronic paper (hereinafter "e-paper") display, a surface-conduction electron-emitter display, a field emission display or an electrochromic display.

In embodiments, the display 14 may be a touch-screen graphic user interface (hereinafter "touch-screen GUI") or a digitized screen connected to a microprocessor (not shown in the figures) of the device 12. The touch-screen GUI may be used in conjunction with a pointing device (not shown in the drawings), such as, for example, a human finger or a stylus to identify a specific position touched by the user and may transfer the coordinates of the specific position to the microprocessor. The microprocessor may obtain the information and/or multimedia data corresponding to the coordinates selected by the user from the memory of the device 12. The device 12 may display or render the selected information and/or the multimedia data to the user. The selected information and/or multimedia data may be indicative one or more goods and/or services offered by the provider and/or desired by the user.

In embodiments, the display 14 may have an electromagnetic induction panel installed on a surface of the display 14 which is connected to the microprocessor of the device 12. An electromagnetic stylus (not shown in the figures) may be associated with the display 14 and may emit an electromagnetic signal to induct a specified position on the electromagnetic induction panel, and an electromagnetic induction controller connected to the electromagnetic induction panel may calculate the coordinates corresponding to the specified position selected by the user. The electromagnetic induction controller may be connected to the microprocessor which may transfer the coordinates to the microprocessor. The microprocessor may obtain the information and/or multimedia data corresponding to the coordinates selected by the user from the memory of the device 12, and the device 12 may display or render the selected information and/or multimedia data to the user.

In embodiments, the device 12 may have a first communication means 16 connected to the microprocessor, a second communication means 18 connected to the microprocessor, a first sensor 20 connected to the microprocessor and/or a second sensor 22 connected to the microprocessor. The device 12 may, optionally, have a third sensor 24 and/or a card authorization system 26 connected to the microprocessor. In embodiments, the first sensor 20, the second sensor 22 and/or the third sensor 24 (hereinafter "the sensors 20, 22, 24") may be, for example, a microsensor or a microelectromechanical system sensor. In embodiments, the device 12 may have an audio output device (not shown in the drawings) which may output or render audio data from the multimedia data stored in the memory of the device 12. The audio output device may include a speaker and/or an earphone interface device.

The first communication means 16 and second communication means 18 (hereinafter "communications means 16, 18) may be a first wireless transducer, such as, for example, a wireless sensor network device, such as, for example, a Wi-Fi network device, a wireless ZigBee device, an EnOcean device, an ultra-wideband device, a wireless Bluetooth device, a wireless Local Area Network (hereinafter LAN) accessing device, a wireless IrDA device and/or the like. In embodiments, the second communication means 18 may be a second wireless transducer which may include an infrared communication device, a radio frequency identification (hereinafter "RFID") tag, RFID reader, a contactless Smart Card and/or a contactless Smart Card reader.

In embodiments, the first sensor 20 may be a switch, such as, a plunger or an optical sensor. The first sensor 20 may determine when the cover 13 is located in the open position or the closed position. The first sensor 20 may be located in a first position when the cover 13 is located in the closed position and may be located in a second position when the cover 13 is located in the open position.

In embodiments, a coverless version of the menu 10 may not have a cover 13, but may include the first sensor 20 to determine whether the menu is in an open position or a closed position based on whether the device 12 has or has not been activated. For example, the menu 10 may be in an open position when the device 12 may be activated and may be in a closed position when the device 12 may be deactivated. Thus, the first sensor 20 may detect activation and deactivation of the device 12 of the menu 10. Moreover, the first sensor 20 may be, for example, a switch, a button or the like that may be activated and/or deactivated by the user of the menu 10 and/or by the employee.

In embodiments, the coverless version of the menu 10 may have a splash screen or screen-saver like functionality that would signify that the menu 10 is in the closed position. In embodiments, the coverless version of the menu 10 may include a slider for moving the menu 10 to the open position or the closed position. In embodiments, the coverless version of the menu 10 may be encased in a protective coating (not shown in the drawings) to protect the device 12 and/or the display of the device 12. Alternatively, the protective cover may serve the same purpose as the cover 13.

In embodiments, the first sensor 20 may be a photo-sensor which emits a signal, such as an infrared signal. The signal may be reflected by the cover 13 and detected by the first sensor 20 when the cover 13 is located in the closed position. When the cover 13 is located in the open position, the signal may not be detectable by the first sensor 20. As a result, the first sensor 20 may determine when the cover 13 is located in the open position or the closed position based on detection or non-detection of the infrared signal.

The first sensor 20 may indicate opening and closing of the cover 13 to the microprocessor based on whether the cover 13 is in the open position or in closed position. The microprocessor may store data regarding the positioning of the cover 13 in the memory of the device 12. The microprocessor may determine when the cover 13 is closed and subsequently opened to calculate and/or identify a number of occurrences or usage count in which the device 12 may be accessed and/or utilized by one or more users.

The second sensor 22 may be, for example, a motion sensor or an orientation sensor. In embodiments, the second sensor 22 may be an optical sensor, an infrared sensor, a level sensor, a gyroscope sensor, a microphone, a photoelectric sensor, a photoswitch, an inclinometer, an infrared thermometer, or an accelerometer. The second sensor 22 may detect or determine that the menu 10 has moved from a first position to a second position. For example, the second sensor 22 may detect an acceleration and a subsequent deceleration which may be separated by more than a few seconds to indicate, for example, that an employee (not shown in the figures) of the provider or the user may have moved the menu 10 from the first location to the second location.

The second sensor 22 may indicate to the microprocessor of the device 12 that the menu 10 has moved from the first location to the second location. The microprocessor may store data regarding the movement of the menu 10. Further, the microprocessor may determine if the menu 10 is being moved by the user or the employee of the provider based on the movement of the cover 13 of the menu 10 as detectable by the first sensor 20.

The optional third sensor 24 may be, for example, a touch sensor, a thermal sensor, or a pressure sensor. The third sensor 24 may detect or determine that the menu 10 may be in contact with or in close proximity to the employee of the provider, the user or another menu. For example, the third sensor 24 may detect that the user is contacting the menu 10 based on an increased temperature detected by the third sensor 24.

The third sensor 24 may indicate surroundings data of the menu 10 to the microprocessor of the device 12 which identifies that the menu 10 is in contact with or in close proximity to the user, the employee or another menu. The microprocessor may store surroundings data regarding the surrounding of the menu 10 in the memory of the device 12. Moreover, the microprocessor may determine if the menu 10 is in contact with or in close proximity to the user, the employee and/or another menu based on the surroundings data of the menu 10 as detected by the third sensor 24.

The optional card authorization system 26 may authorize payment for the goods and/or services ordered by the user via a credit card, a charge card, a debit card and/or the like. In embodiments, the optional card authorization system 26 may be, for example, a Speedpass transactional device or other transactional devices as known to one having ordinary skill in the art. The card authorization system 26 may allow the user to pay for the goods and/or services by submitting and completing a transaction for payment to the provider of the goods and/or services from an acquirer, such as a bank, financial institution and/or the like. The user may enter a personal identification number to authorize the transaction via the display 14 of the device 12. Upon completion of the transaction, the provider of the goods and/or services may receive payment for the transaction from the acquirer. The device 12 may be programmed with handwriting recognition software such that the user may electronically sign and authorize the transaction with the provider. In embodiments, the user may use the handwriting recognition software for taking notes about their experience at the establishment of the provider which may be electronically mailed to an electronic mail account or the like. The handwriting recognition software may be used for entering information, such as, for example, a hotel room number, a user account number for personalization, feedback for the establishment or a comment card into the device 12.

Figure 1B:
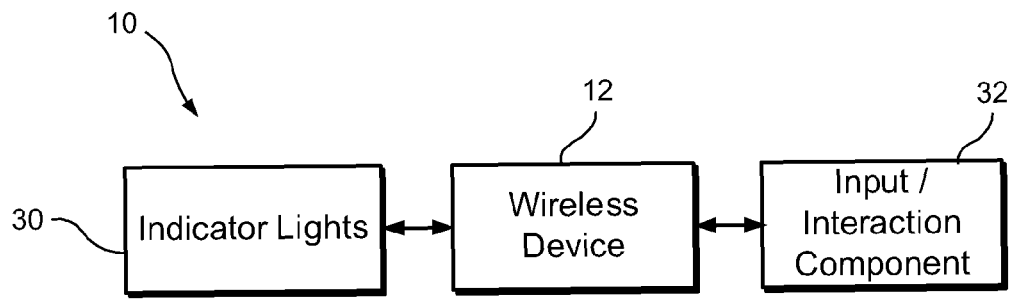
FIG. 1B illustrates a block diagram of an electronic menu system in accordance with the present disclosure.

In embodiments, FIG. 1B illustrates the menu 10 which may have a light indicator 30 and/or an input/interaction component 32. The light indicator 30 may include a indicate power on/off light, battery charge status light, menu grouping status light, network communication status light and/or the like. The indicate power on/off light may indicate or identify whether the menu 10 is activated or deactivated. The battery charge status light may indicate a charge amount of the battery of the menu 10. The menu grouping status light may indicate whether the menu 10 has been assigned to or associated with a menu grouping. The network communication status light may indicate whether the menu 10 is connected to a communication network as shown in FIG. 2. The present disclosure should not be deemed as limited to a specific embodiment of the light indicator 30 of the menu 10.

In embodiments, the input/interaction component 32 may include a touch screen, a digital/physical keyboard, one or more navigation buttons, a power button, a reset button and/or the like. The touch screen, the digital/physical keyboard and/or one more navigation buttons may utilized to navigate and/or to manipulate the device 12 of the menu 10. The power button may be utilized to activate and/or deactivated the device 12 of the menu 10. The reset button may be utilized to reset or restart the device 12 of the menu 10. The present disclosure should not be deemed as limited to a specific embodiment of the input/interaction component 32.

FIG. 2 illustrates a system 100 for managing one or more electronic menus in accordance with the present disclosure. The system 100 may include a first electronic menu 10a (hereinafter "first menu 10a"), a second electronic menu 10b (hereinafter "second menu 10b"), a first computer network 104a (hereinafter "first network 104a") and/or a second computer network 104b (hereinafter "second network 104b"). Further, the system 100 may have a primary computer terminals 106 (hereinafter "terminal 106"), a secondary computer terminal 107 (hereinafter "terminal 107"), a proximity sensor 108, a server 110 and/or a database 112 of the server 110. The present disclosure should not be deemed as limited to a specific number of menus and/or users which may access and/or may utilize the system 100. It should be understood that the system 100 may include any number of secondary computer terminals as known to one of ordinary skill in the art.

Optionally, the system 100 may have a charging base 114 which may be electrically connected to the terminal 106 and/or the terminal 107 (hereinafter "terminals 106, 107"). As a result, the charging base 114 may be in communication with the terminals 106, 107. In embodiments, the charging base 114 may be wirelessly connected to the terminals 106, 107. The charging base 114 may electrically charge the first menu 10a and the second menu 10b (hereinafter "the menus 10a, 10b"). The charging base 114 may have a dock sized to receive the menus 10a, 10b or a portion of the menus 10a, 10b, such that the menus 10a, 10b may be connected to the charging base 114 via the dock. While docked to the charging base 114, the menus 10a, 10b may electrically connect to a charging base 114 for electrically charging a rechargeable battery (not shown in the figures) of the menus 10a, 10b. As a result, the rechargeable battery of the menus 10a, 10b may be charged by the charging base 114. It should be understood that system 100 may include any number of charging bases as known to one of ordinary skill in the art.

In embodiments, the charging base 114 may be digitally connectable to the terminals 106, 107. The charging base 114 may connect the menus 10a, 10b to the terminals 106, 107, and the menus 10a, 10b may be in communication with charging base 114. The terminals 106, 107 may update and/or synchronize the information and/or multimedia data stored in the memory of the menus 10a, 10b with updated information and/or multimedia data stored in the terminals 106, 107 and/or the database 112. The menus 10a, 10b may be connected to the charging base 114 by a connector (not shown in the figures), such as a USB port, a cable and/or the like.

In embodiments, more than one electronic menu, more than one charging base and more than one secondary terminal may be provided. Each charging base may be associated with a specific secondary terminal to enable the secondary terminal to determine a status for menus docked at that charging base. For example, the primary terminal 106 may be located in a central location, such as in a hotel and may be connected to the second network 104b, which may be the Internet. A spa of the hotel may have a secondary terminal and a charging station associated with the secondary terminal. Similarly, a golf course of the hotel may have a second terminal and charging system associated with the secondary terminal of the golf course. Users of the menus may transport and/or deliver the menus to the charging stations of the spa and/or the golf course.

In embodiments, the terminals 106, 107 may be a point of sale computer system, a PC, a backend server with databases and/or the like. The terminal 106 may be local or remote with respect to the menus 10a, 10b and/or the terminal 107. In embodiments, the terminal 106 may be a base station that serves as a main on-site terminal for the establishment of the provider and/or the terminal 107 may be a point of sale computer. The terminals 106, 107 may be connected to and/or may access the first network 104a. As a result the terminals 106, 107 may be connected and in communication via the first network 104a. In embodiments, the terminal 107 may be local or remote with respect to the menus 10a, 10b.

The menus 10a, 10b may connect to and/or may access the first network 104a via the first communication means 16 of the menus 10a, 10b, respectively. The terminals 106, 107 may be connected to the first network 104a, and the menus 10a, 10b may access the terminals 106, 107 via the first network 106 and the first communication means 16. As a result, the menus 10a, 10b may be in communication with the terminals 106, 107 of the system 100 and may access the information and multimedia data stored in the terminals 106, 107. In embodiments, the menus 10a, 10b may establish a secured wireless connection to the terminals 106, 107 via the first network 104a.

The server 110 and the database 112 may be local or remote with respect to the terminals 106, 107 and/or the menus 10a, 10b. The terminals 106, 107 and the server 110 may be connected to the second network 104b. As a result, the terminals 106, 107 may be in communication with the server 110 and may access the database 112 via the server 110. When the server 110 and database 112 is local with respect to the terminal 106, the menus 10a, 10b may be connected to and in communication with the server 110 and may access the information and multimedia data stored in the database 112 via the terminals 106, 107, the first network 104a and the second network 104b. In embodiments, the terminal 107 is not capable of directly accessing the server 110, the database 112 and/or the second network 104b.

In embodiments, the server 110 and the database 112 may be local with respect to the terminal 106. The terminal 106 may be connected to the server 110 via the second network which may be, for example, a LAN communication network, intranet and/or the like. Additionally, the server 110 may connect to and communication with an Internet server (not shown in the drawings) via a third communication network (not shown in the drawings), such as, for example, the Internet.

In embodiments, the server 110 and database 112 may be remote with respect to the terminal 106. The terminal 106 may connect to the server 110 via the second network which may be, for example, the Internet.

The system 100 may, optionally, have a remote user terminal 120 (hereinafter "terminal 120") of a remote user (not shown in the figures). The terminal 120 may be remote with respect to the terminals 106, 107, the menus 10a, 10b, the server 110 and/or the database 112. The terminal 120 may be connectible to the second network 104b for accessing the terminals 106, 107, the server 110 and/or the database 112. The terminal 120 may access and display the information and/or multimedia data stored in the terminals 106, 107 and/or the database 112 of the server 110. The terminals 106, 107 and/or the server 110 may transmit the information and/or multimedia data to the terminal 120 over the second network 104b. In embodiments, a notification, such as electronic mail may be transmitted from the terminals 106, 107 and/or the server 110 to the terminal 120 over the second network 104b. The notification may include advertising media, mailing list information and/or promotional materials regarding goods and/or services offered by the provider and/or by additional providers.

In embodiments, the remote user may access web-based content, such as a website of the provider which may stored in the database 112 via the terminal 120, the server 110 and/or second network 104b. In embodiments, the server 110 accessible by the terminal 120 may be an Internet server or the like. The remote user may create or update a user profile via the website of the provider and may store profile information in the terminals 106, 107 and/or the database 112. The profile information may include information indicative of and associated with the remote user and/or of desired goods and/or services of the remote user. Additionally, the remote user may request to receive the notification regarding the provider and/or the additional providers via website of the provider. The present disclosure should not be deemed as limited to a specific embodiment of the notification and the profile information of the remote user.

In embodiments, the first network 104a and the second network 104b (hereinafter "networks 104a, 104b") may be, for example, a personal area network (PAN), a local area network (LAN), a campus area network (CAN), a Metropolitan area network (MAN), a wide area network (WAN) and/or the like. The networks 104a, 104b may operate according to basic reference model, such as, for example, a four-layer Internet Protocol Suite model, a seven-layer Open Systems Interconnection reference model and/or the like.

In an embodiment, the networks 104a, 104b may be a wireless network, such as, for example, a wireless MAN, a wireless LAN, a wireless PAN, a Wi-Fi network, a WiMAX network, a global standard network, a personal communication system network, a pager-based service network, a general packet radio service, a universal mobile telephone service network, a radio access network and/or the like. It should be understood that the first network 104a may be any wireless network capable of connecting the menus 10a, 10b to the terminals 106, 107 as known to one having ordinary skill in the art.

In an embodiment, the second network 104b may be a fixed network, such as, for example, an optical fiber network, an Ethernet, a cabled network, a permanent network, a power line communication network and/or the like. In an embodiment, the networks 104a, 104b may be a temporary network, such as, for example, a modem network, a null modem network and/or the like. In embodiments, the second network 104b may be an intranet, extranet or the Internet which may also include the world wide web. The present disclosure should not be limited to a specific embodiment of the fixed network of the second network 104b.

The proximity sensor 108 may be located at a position with respect to the menus 10a, 10b and/or the first network 104a. For example, the proximity sensor 108 may be located on a table 116 within a room of the provider as shown in FIG. 2. In embodiments, the proximity sensor 108 may be positioned between the menus 10a, 10b or may be positioned remotely with respect to the menus 10a, 10b.

The proximity sensor 108 may communicate with the menus 10a, 10b via the second communication means 18 of the menus 10a, 10b. The proximity sensor 108 may detect and identify the menus 10a, 10b via the second communication means 18 of the menus 10a, 10b. In embodiments, the proximity sensor 108 may detect or determine locations of the menus 10a, 10b in the room and/or with respect to the proximity sensor 108. For example, the proximity sensor 108 may determine the locations of the menus 10a, 10b on the table 116 within the room of the provider as shown in FIG. 2 and transmit location data of the menus 10a, 10b to the menus 10a, 10b. As a result, the menus 10a, 10b may transmit the location data to terminals 106, 107 which may associate the menus 10a, 10b with the table 116 based on the location data of the menus 10a, 10b detected by the proximity sensor 108. In embodiments, the proximity sensor 108 may communicate with other proximity sensors (not shown in the drawings) to form a network of sensors in the establishment of the provider which may track and locate the menus 10a, 10b. The terminals 106, 107 may associate menus 10a, 10b with the table 116 and/or may transmit the location data of the menus 10a, 10b to the server 110 for storing in the database 112.

In embodiments, the proximity sensor 108 may be a wireless sensor network device, an infrared communication device, a RFID tag, RFID reader, a contactless Smart Card or a contactless Smart Card reader. In embodiments, the proximity sensor 108 may be, for example, an ultrasonic position sensor, an optical position sensor or an electromagnetic position sensor. It should be understood that the proximity sensor may be any device that may be capable of detecting and communication with the second communication means 18 of the devices 10a, 10b as known to one of ordinary skill in the art.

The information and/or multimedia data stored in and accessible from the memory of the device 12 may be preloaded into the memory of the device. Alternatively, the information and/or multimedia data may be stored in the database 112 which may be accessible by the terminals 106, 107 and/or the menus 10a, 10b via the server 110 and the networks 104a, 104b. As a result, the menus 10a, 10b may download the information and multimedia data from the server 112. The menus 10a, 10b may display and/or render the information and/or multimedia data to the user and may store the information and/or multimedia data in the memory of the devices 10a, 10b, respectively. The menus 10a, 10b may not render the information and/or multimedia data until the information and/or multimedia data may be completely or substantially completely received from the terminals 106, 107 and/or the server 112. Alternatively, the menus 10a, 10b may utilize streaming media technology to simultaneously download and render the information and/or multimedia data.

The information and/or multimedia data may be displayed and/or rendered to the user via the display 14 and/or the audio output device of the device 12. The information and/or multimedia data may be displayed and/or rendered by the terminals 106, 107 of the provider and/or the terminal 120 of the remote user. The information and/or multimedia data may relate to and be indicative of one or more goods and/or services offered by the provider or by the additional providers. The information and/or multimedia data may include text, images, sound, music, and/or video indicative of and associated with the goods and/or services offered by the provider or by the additional providers. The information and/or multimedia data may be displayed or render in one or more languages which may be selectable by the user or the remote user. Moreover, prices for the goods and/or services may be displayed in one or more currencies, languages and/or locales which may be selectable by the user or the remote user.

In embodiments, the information and/or multimedia data may include current or updated menu information associated with and indicative of the goods and/or services available and offered by the provider and/or the additional providers. Further, the information and/or multimedia data may include, for example, food ratings and reviews, nutritional information including calories and fat content, wine descriptions and pairings, suggestive selling, upgrades or add-ons, wine-maker features, staff tasting notes, user comments, feedback/ratings and/or recipes. In embodiments, the information and/or multimedia data may include a preparation style or procedure of one or more goods and/or services, a preparing status of one or more goods and/or services, promotional information regarding one or more events promoted by the provider, one or more cooking materials, a flavor of the food item, nutrition ingredients of a food item and/or health effects and/or potential allergic reactions associated with consumption of the food item.

In embodiments, the menus 10a, 10b may be programmed with search engine software that may allow more than one food item to be search and identified based on the information and/or multimedia data indicative of the goods and/or services available and offered by the provider. For example, the menus 10a, 10b may search the information and/or multimedia data indicative of the goods and/or service to identify which foods may be low-fat foods or which may be prepared with a potentially allergic ingredient, such as, peanuts or the like.

In embodiments, the server 110 may be programmed with software for rendering the advertising media to the menus 10a, 10b, the terminals 106, 107 and/or the terminal 120. The menus 10a, 10b may access, download and/or render advertising media stored in the terminals 106, 107 and/or the database 112 via the server 110 and the networks 104a, 104b. The terminals 106, 107 and/or the terminal 120 may display and render the advertising media stored in the terminals 106, 107 and/or the database 112 of the server 110.

The advertising media may be, for example, a commercial, an advertisement, an audio transmission, a video, an interview, a commentary, a documentary and/or the like. In embodiments, the advertising media may relate to and be indicative of an entity, such as, for example, a corporate entity, a marketing agency, a media distributor, a consumer products producer, an advertising agency, a manufacturer, a government agency, a travel corporation, an entertainment corporation and/or the like. The present disclosure should not be limited to a specific embodiment of the entity associated with the advertising media. It should be understood that the advertising media may be any type of advertising media as known to one of ordinary skill in the art.

In embodiments, the menus 10a, 10b may access, download and/or render digital media files stored in the database 112 via the server 110. The digital media files may include, for example, electronic mail, audio signals, still images, video frames, data feeds, data streams, program guides, text information, musical compositions, radio programs, audio books, audio programs, cable television programs, satellite television programs, public access programs, motion pictures, animated works, music videos, animated works, video programs, video games and/or soundtracks, video tracks of audiovisual works and/or user generated content, such as, user feedback, user ratings and/or the like. In an embodiment, the audiovisual works may be, dramatic works, film scores, operas, performances, concerts, plays, operettas, ballets, musicals, circus acts and/or the like.

In embodiments, users may be directed to the table 116 by the employee of the provider. While seating the users, the employee may carry the menus 10a, 10b to the table 116. Before seating the users, the second sensor 22 and/or the third sensor 24 (hereinafter "sensors 22, 24") may detect that the employee is moving the menus 10a, 10b and/or that the employee is in contact with the menus 10a, 10b. In embodiments, the terminal 107 and/or the sensors 22, 24 of the menus 10a, 10b may detect that the menus have been removed from the charging base 114. The microprocessor of the device 12 of the menus 10a, 10b may receive the data regarding movement and surroundings of the menus 10a, 10b from the sensors 22, 24, respectively. The microprocessor may determine that the cover 13 is located in the closed position via the first sensor 20 and may transmit the data regarding the cover 13 to the terminals 106, 107 via the first communication means 16 over the first network 104a.

The sensors 20, 22, 24 may detect a motion or an acceleration of the menus 10a, 10b in a direction, at a magnitude and/or for a duration of time. The microprocessor of device 12 of the menus 10a, 10b may identify and transmit the acceleration data for the menus 10a, 10b to the terminals 106, 107 via the first network 104a. The terminals 106, 107 may identify and store the acceleration data for the menus 10a, 10b as detected by the sensors 20, 22, 24. The menus 10a, 10b may be assigned to a menu grouping or grouped together based on the acceleration data for the menus 10a, 10b. For example, the menus 10a, 10b may be accelerated in the same or substantially the same direction, at the same or substantially the same magnitude for the same or substantially the same duration of time. The terminals 106, 107 may compare the acceleration data for the menus 10a, 10b and determine that the menus 10a, 10b have the same or substantially the same acceleration data. The terminals 106, 107 may determine that the menus 10a, 10b moved to the same or substantially the same destination position or table. As a result, the terminals 106, 107 may assign the menus 10a, 10b to a menu grouping or group menus 10a, 10b together.

The terminals 106, 107 may determine that the menus 10a, 10b are being moved by and are in contact with the employee and that the cover 13 of the menus 10a, 10b is in the closed position. The terminals 106, 107 may or may not transmit updated information and/or multimedia data indicative of the goods and/or services available and offered by the provider to the menus 10a, 10b via the first communication means 16 of the menus 10a, 10b over the first network 104a. Alternatively, the terminals 106, 107 may retrieve the updated information and/or multimedia data from the database 112 and transmit the updated information and/or multimedia data to the menus 10a, 10b. The microprocessor of the menus 10a, 10b may store the updated information and/or multimedia data in the memory of the device 12 of the menus 10a, 10b.

In embodiments, the users may be seated at table 116 and the employee may place the menus 10a, 10b on the table 116 such that the proximity sensor 108 is located between the menus 10a, 10b as shown in FIG. 2. FIG. 2 illustrates a table configuration 118 for the table 116 having two users (each having one of the menus 10a, 10b) at a square-shaped or rectangularly-shaped table facing each other. In embodiments, the table 116 may have different shapes and sizes to accommodate different configurations and different numbers of users. For example, the table 116 may be an oval-shaped table (not shown in the figures) having five users located along the perimeter of the table or a square shaped table (not shown in the figures) having four users with a single user located at each side of the table. The present disclosure should not be limited to a specific embodiment of the configuration 118 of the table 113 or the numbers of users at the table 113.

The proximity sensor 108 may communicate with the second communication means 18 of the menus 10*a*, 10*b* to detect the locations of the menus 10*a*, 10*b* on the table 113 and the configuration 118 of the table 113. The proximity sensor 108 may transmit data regarding the configuration 118 of the table 113 and the locations of the menus 10*a*, 10*b* on the table 113 to the terminals 106, 107 via the first network 104*a*. The terminals 106, 107 may identify the configuration 118 and the locations of the menus 10*a*, 10*b* and may store the data regarding the configuration 118 and the locations of the menus 10*a*, 10*b*.

The users or the employee may activate the menus 10*a*, 10*b* open the cover 13 of the menus 10*a*, 10*b* and the microprocessor of the device 12 of the menus 10*a*, 10*b* may detect that the cover 13 has been moved to the open position via the first sensor 20 of the menus 10*a*, 10*b*. The device 12 may transmit data regarding the cover 13 of the menus 10*a*, 10*b* being located in the open position to the terminals 106, 107. The terminals 106, 107 may determine that the cover 13 of the menus 10*a*, 10*b* is in the open position and may terminate subsequent transmissions of the updated information and/or multimedia data until the cover 13 of the menus 10*a*, 10*b* may be located in the closed position or the menu 10*a*, 10*b* are deactivated. In embodiments of the menus 10*a*, 10*b* without the cover 13, the sensor 20 of the menus 10*a*, 10*b* may detect that the menu 10*a*, 10*b* are in an open or closed position based on whether the menus 10*a*, 10*b* may be activated or deactivated respectively. The microprocessor of the device 12 of the menus 10*a*, 10*b* may detect that the menus 10*a*, 10*b* may have been moved to the open position via the first sensor 20 of the menus 10*a*, 10*b*.

The menus 10*a*, 10*b* may display or render the updated information and/or multimedia data indicative of the available goods and/or services to the users via the device 12 of the menus 10*a*, 10*b* or to the remote user via the terminal 120. The audio output device and/or the display 14 of the menus 10*a*, 10*b* and/or the terminal 120 may provide multi-linguistic texts, audio and video to users for the updated information and multimedia data indicative of the available goods and/or services. Optionally, the device 10*a*, 10*b* may access and render the advertising media to the users while the users view the menus 10*a*, 10*b*. The users may identify and order desired goods and/or services selected from updated information and/or multimedia data for the available goods and/or service offered by the provider. The microprocessor of the devices 10*a*, 10*b* may transmit the order for the desired goods and/or services to the terminals 106, 107 via the first network 104*a*. The terminals 106, 107 may determine the orders received from the menus 10*a*, 10*b* and match the orders with the menus 10*a*, 10*b* based on the data stored therein related to the configuration 118 of the table 113 and/or the locations of the menus 10*a*, 10*b* at the table 113. Optionally, the users may, at any time, use the card authorization system 26 to authorize one or more transactions to pay for the orders of the desired goods and/or services.

In embodiments, the users may, optionally, create user profiles by utilizing the web-based content accessible from the terminals 106, 107 or the database 112 via the menus 10*a*, 10*b*. The users may enter profile information for the user profiles into the menus 10*a*, 10*b* which may be stored in the terminals 106, 107 and/or the database 112. Moreover, the users may request that the notification be sent from the terminals 106, 107 to the terminal 120 or the menus 10*a*, 10*b*.

The users may, optionally, call the employee to provide incidental services by transmitting a call signal from the menus 10*a*, 10*b* to the terminals 106, 107 via the first network 104*a*. Additionally, the employee may inform the users of a processing status of the orders via the terminals 106, 107 and the menus 10*a*, 10*b*. The menus 10*a*, 10*b* may calculate and display a running bill total for the orders (which may or may not include tax costs and suggested tip costs) to the users. After placing the orders, the menus 10*a*, 10*b* may access and render digital media files and/or the advertising media to the users.

In embodiments, the menus 10*a*, 10*b* of the system 100 may communicate with each other via the second communication means 18 of the menus 10*a*, 10*b* or via the first network 104*a* and the first communication means 16 of the menus 10*a*, 10*b*. The users of the menus 10*a*, 10*b* may transmit communications regarding the provider and/or the goods and/or services offered or rendered by the provider to other users of other menus. The communications may include text messages, instant messages, notes, comments, reviews, rating information and/or the like. The present disclosure should not be deemed as limited to a specific embodiment of the communications transmittable by the menus 10*a*, 10*b*.

The systems and methods of the present disclosure may accurately calculate and determine a number of uses of the menu 10 by more than one user at the establishment of the provider. The systems and methods may correct for errors regarding uses of the menu 10 and may eliminate false counts of uses of the menu 10 by either manual interaction between the menu 10 and the employee or by an automatic detection process executed by the device 12 of the menu 10.

In embodiments, the employee may manually interact with the device 12 of the menu 10 prior to delivery of the menu 10 to the user. The employee may manually increase the usage count for the menu 10 by interacting with the device 12 of the menu 10. After the menu 10 is delivered to the user, the user may open the cover 13 of the menu 10 to interact with the device 12 for viewing the available goods and/or services offered by the provider and selecting at least one desired good and/or service from the menu 10. By manually increasing the usage count of the menu 10, the menu 10 may be opened and closed more than one time without additionally increasing the usage count of the menu 10. Opening and closing the menu 10 multiple times will constitute a single use with respect to the usage count of the menu 10.

In embodiments, the device 12 of the menu 10 may be programmed with a time parameter to identify a duration of time that may constitute a single use. For example, a time usage parameter of 15 minutes, 10 minutes, 5 minutes or 2 minutes may be programmed into the device 12 such that the user may open and close the cover 13 of the menu 10 several times within the time parameter without increasing the usage count of the menu 10. In embodiments, a time since last usage parameter of 15 minutes, 10 minutes, 5 minutes or 2 minutes may be programmed into the device such that if the users may open the cover 13 of the menu 10 after the expiration of the last usage parameter, then the usage count of the menu 10 may be increased. The present disclosure should not be deemed as limited to a specific embodiment of the time usage parameter.

In embodiments, the data detected with the first sensor 20 may be combined the data detected with the second sensor 22 such that the usage count is only incremented if the menu cover 13 is opened after the menu 10 has been in motion for a predetermined motion distance or a predetermined motion time. The predetermined motion distance or the predetermined motion time may be sufficient to indicate that the menu 10 has been moved between more than one table. In embodiments, a predetermined acceleration magnitude, a predetermined direction and/or the predetermined time may be sufficient to indicate that the menu 10 has been moved between more than one table. For example, the predetermined motion distance may be 10 feet, 8 feet, 5 feet or 2 feet. If the data detected by the first sensor 20 indicates that the cover 13 of the menu 10 is closed and the data detected by the second sensor 22 indicates that the menu 10 has moved a distance greater than the predetermined motion distance, then the usage count of the menu may be increased. In an embodiment, the predetermined motion time may be, for example, 2 minutes, 1 minute, 45 seconds or 15 seconds. If the data detected by the first sensor 20 indicates that the cover 13 of the menu 10 is closed and the data detected by the second sensor 22 indicates that the menu 10 has been in movement for an amount of time greater than the predetermined motion time, then the usage count of the menu 10 may be increased. The present disclosure should not be deemed as limited to a specific embodiment of the predetermined motion distance or the predetermined motion time.

In embodiments, the data detected by the first sensor 20 may be combined with the data collected from the proximity sensor 108 such that the usage count for the menu 10 is increased if the cover 13 of the menu 10 may be opened after the menu 10 has been associated with the table 13 via proximity sensor 13 and the second communication means 18. In other words, if the terminals 106, 107 determine that the cover 13 has been opened based on the data detected from the first sensor 20 and that the menu 10 has been associated with the table 113, then the usage count of the menu 10 may be increased.

In embodiments, the systems and methods of the present disclosure may group together more than one menu to identify and define a menu grouping. The grouping of the menus together may facilitate local screen sharing common menu content between the more than one menus at the same table. For example, the terminals 106, 107 of the system 100 may group the menus 10a, 10b together such that the display 14 of both the menus 10a, 10b may display the common menu content, such as the same information and multimedia data indicative of the available and offered goods and/or services. In embodiments, the goods and/or services displayable and selectable may be include aggregate selections or predetermined selections for the group which may be associated with the menus 10a, 10b at a specific table, such as the table 113.

The menus 10a, 10b may be grouped together based on a common table or a common party. For example, menus 10a, 10b may be grouped together based on the determination that both of the menus 10a, 10b are located at or associated with the same table 116. In another example, more than one menu located at more than one table may be grouped together based on the determination that the more than one menu and/or the more than one table may be associated with a social or dining party, such as a holiday party, a wedding party, a birthday party or the like. It should be understood that the present disclosure is not deemed as limited to a specific embodiment of the social or dining party.

In embodiments, the association of more than one menu and/or more than one table may be predetermined and/or may be programmed into the more than one menu or the terminals 106, 107 of the system 100. For example, the employee may manual interact with more than one menu to associate more than one menu with the group or the social or dining party. For example, the menus 10a, 10b may be associated with the group by the employee manually entering a unique identifier associated with the group, the proximity sensor 108 automatically suggesting the group based on the locations of the menus, and/or the employee selecting a group from a list of candidates based on existing group information.

In embodiments, the third sensor 24 of the menus 10a, 10b may detect contact between the menus 10a, 10b for a predetermined contact period of time, such as, for example, 5 minutes, 2 minutes, 1 minute or 15 seconds. For example, the employee may stack the menus 10a, 10b while the employee delivers the menus 10a, 10b to the table 116. The third sensor 24 of the menus 10a, 10b may detect that the menus 10a, 10b are in contact with each other. The third sensor 24 of the menus 10a, 10b may detect separation of the menus 10a, 10b when the menus 10a, 10b are separated and placed on the table 116. Upon separation of the menus 10a, 10b at the table 116, the microprocessors of the menus 10a, 10b may associate with each of the menus 10a, 10b with the table 116 to form a group. Alternatively, the microprocessor of the menus 10a, 10b may determine that the menus 10a, 10b are in a proximity to each other and the table 116 and/or may associate the menus 10a, 10b with the table 116. The menus 10a, 10b may associate with each other to form the group based on the determination of proximity of the menus 10a, 10b with respect to each other or the table 116 or the association of the menus 10a, 10b with table 116.

In embodiments, the menus 10a, 10b that may be associated with the group may be assigned a menu grouping status based on the social or dining party. The data detected by the first sensor 20 may or may not be combined with the menu grouping status such that the usage count of the menu may be increased if the cover 13 of the menu 10 is opened after a change in the menu grouping status.

In embodiments, the systems and methods may correct for errors regarding uses of the menu 10 and may eliminate the false counts for uses of the menu 10 by an automatic detection process executed by the device 12 of the menu 10. A predetermined contact period of time, such as, for example, 12 minutes, 10 minutes, 5 minutes or 2 minutes, may be programmed into the menus 10a, 10b. If the menus 10a, 10b are in contact with each other as detected by the third sensor 24 for the predetermined contact period of time and then subsequently separated from each other, then the usage count for the menus 10a, 10b may be increased. For example, the menus 10a, 10b may be stacked for storage and the menus 10a, 10b may be in contact with each other for 5 minutes. The menus 10a, 10b may be separated during distribution of the menus 10a, 10b to the users at the table 116. Thus, separating of the menus 10a, 10b after storage for more than 5 minutes may constitute a use of the menus 10a, 10b and the usage count for the menus 10a, 10b may be increased.

In embodiments, the first menu 10a may be in proximity to the table 116 and/or to the second menu 10b which may be detected by the second communication means 18 of the devices 10a, 10b. The proximity data regarding the proximity of the first menu 10a with respect to the table 116 and/or the second menu 10b may be stored in the memory of the device 12 of the menus 10a, 10b. A predetermined motion period of time, such as, for example, 5 minutes, 1 minutes, 30 seconds or 10 seconds may be programmed into the device 12 of the menus 10a, 10b to limit the menus 10a, 10b to a single use during the period of time. A predetermined motion distance which may be 10 feet, 8 feet, 6 feet or 2 feet may be programmed into the menus 10a, 10b. The proximity data detected by second communication means 18 of the menus 10a, 10b may be combined with data collected by the second sensor 22 of the menus 10a, 10b such that the usage count may be increased if the first menu 10a may be wirelessly associated with a nearby table (not shown in the drawings) after the first menu 10a has been moved more than the predetermined motion distance or has been in motion for a period of time greater than the predetermined motion period of time.

In embodiments, the data detected by the second communication means 18 may be combined with the menu grouping status such that the usage count may or may not be increased if the menus 10a, 10b may wirelessly associate with the nearby table after a change in the menu grouping status.

In embodiments, if complementary acceleration and deceleration of the menu 10 may be detected by the second sensor 22 and the acceleration and deceleration of the menu 10 are separated by more than the predetermined motion period of time, then the usage count may be increased at a subsequent opening of the cover 13 of the menu 10 by the user. In embodiments, if complementary acceleration and deceleration of menus 10a, 10b are detected by the second sensor 22 of the menus 10a, 10b, then the menus 10a, 10b may be correlated and/or the menus 10a, 10b may be grouped together. Thus, menu grouping of more than one menu, such as menus 10a, 10b may or may not be determined and/or identified by complementary acceleration and deceleration of the menus 10a, 10b as detected by the second sensor 22 of the menus 10a, 10b.

Figure 3:
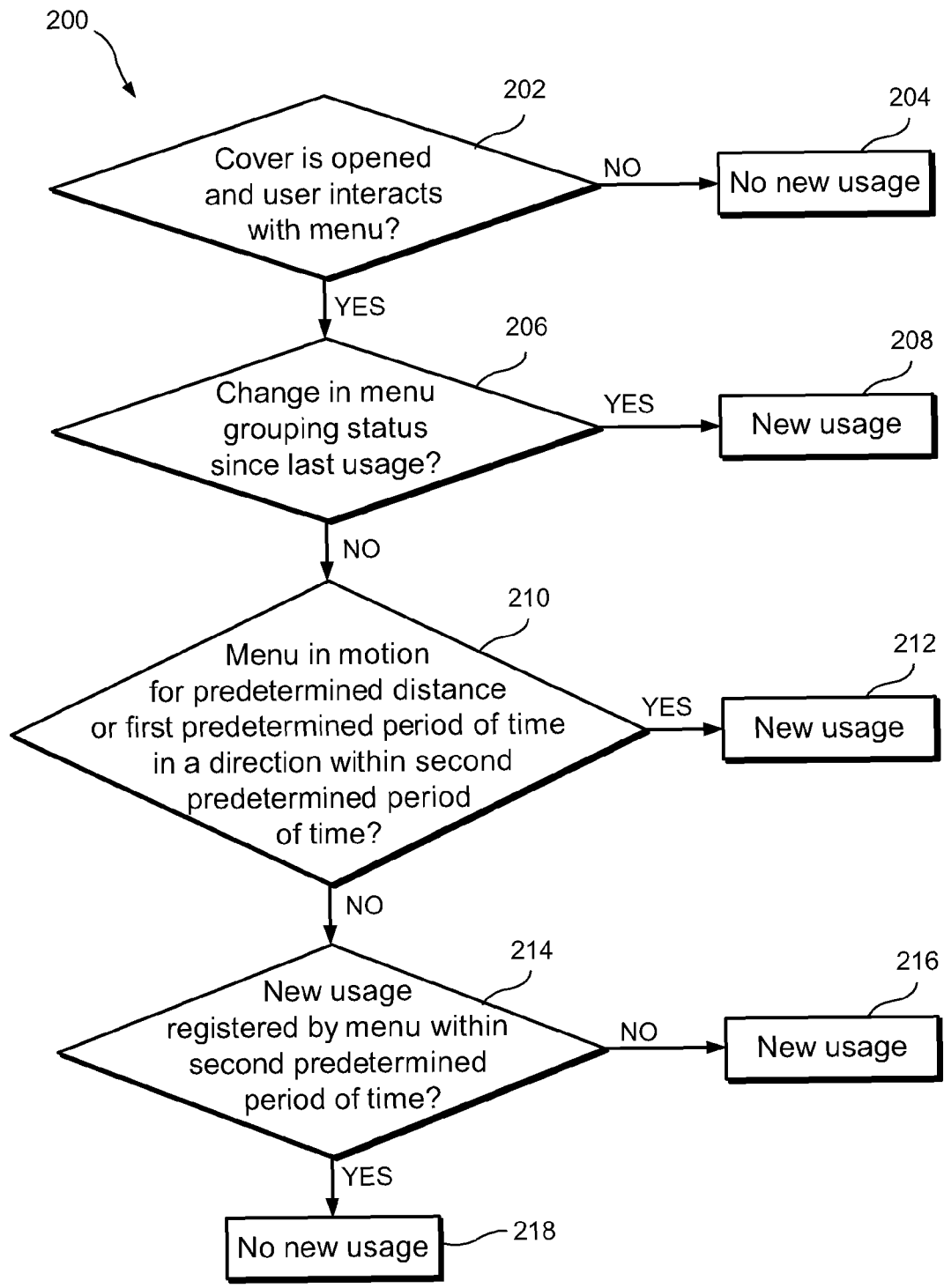
FIG. 3 illustrates a flow chart of a method for counting usage of an electronic menu system in accordance with the present disclosure.
Figure 4:
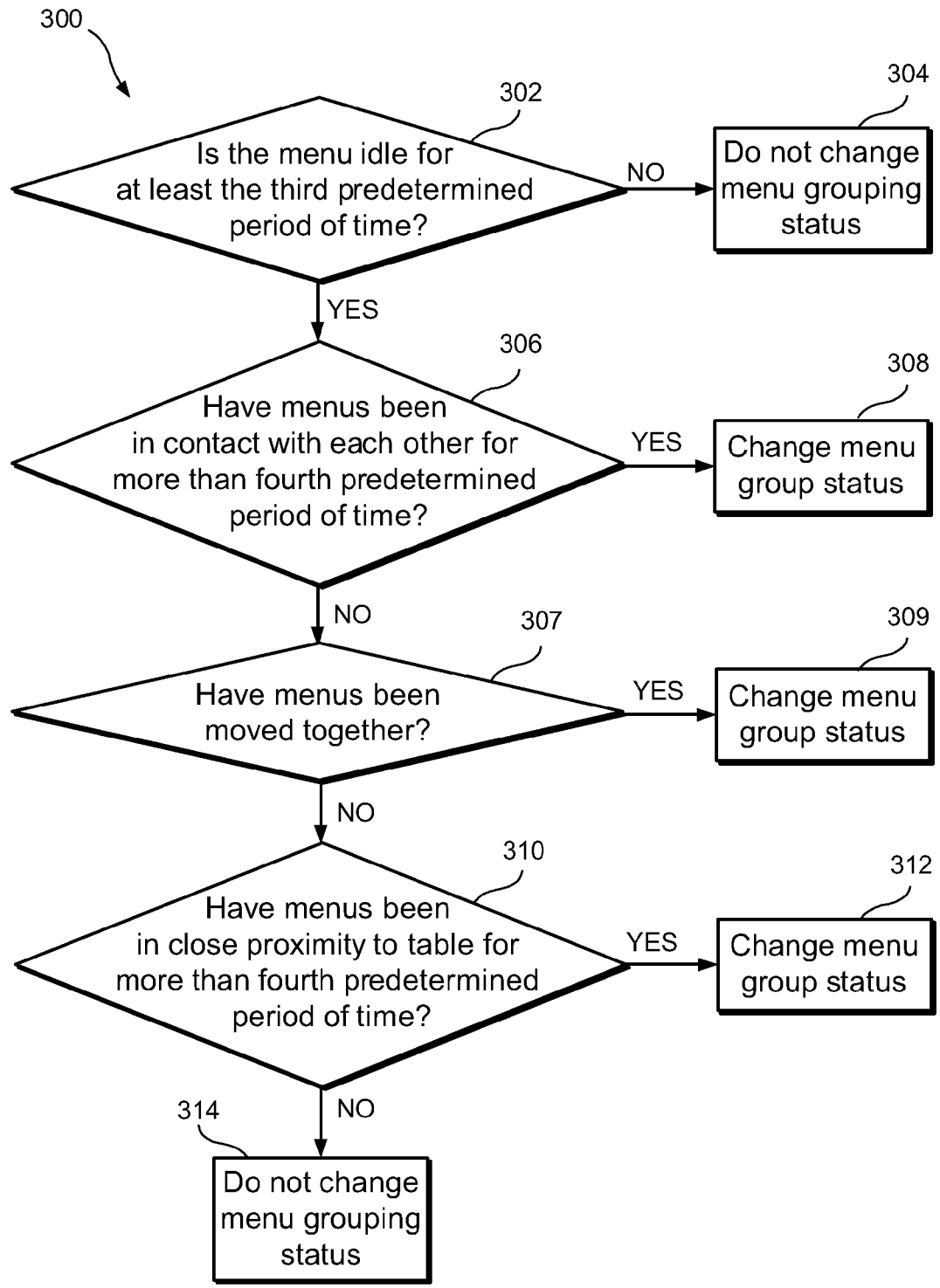
FIG. 4 illustrates a flow chart of a method for determining a menu group status in accordance with the present disclosure.

FIG. 3 illustrates a method 200 for counting usage of the menus 10a, 10b by one or more users. The users may or may not open the cover 13 of the menus 10a, 10b and may or may not interact with the menus 10a, 10b as shown at Step 202. If the users do not open the cover 13 of the menus 10a, 10b and do not interact with the menus 10a, 10b, then no new usage has occurred as shown at Step 204. If the users open the cover 13 of the menus 10a, 10b and/or interact with the menus 10a, 10b, then the terminals 106, 107 may determine if there has been a change in a menu grouping status of the menus 10a, 10b (a change in the menu grouping status for the menus 10a, 10b may be determined by method 300 as shown in FIG. 4) since the last usage of the menus 10a, 10b as shown at Step 206. If there has been a change in the menu grouping status of the menus 10a, 10b, then there has been a new usage and the usage counter for menus 10a, 10b may be increased as shown at Step 208.

If the terminals 106, 107 have determined that there has not been a change in the menu grouping status for the menus 10a, 10b, then the terminals 106, 107 may determine if the menus 10a, 10b have been in motion for a predetermined distance (such as, 10 feet, 8 feet, 5 feet or 2 feet) or a first predetermined period of time (such as, 1 minute, 30 seconds, 10 seconds or 5 seconds) in one direction within a second period of time (such as, 12 minutes, 10 minutes, 5 minutes or 2 minutes) as shown at Step 210. If the menus 10a, 10b have been in motion for the predetermined distance or the first predetermined period of time in one direction within the second predetermined period of time, then a new usage has occurred and the usage counter for menus 10a, 10b may be increased as shown at Step 112.

If the menus 10a, 10b have not been in motion for the predetermined distance or for the first predetermined period of time in one direction within the second period of time, then the terminals 106, 107 may determine if a new usage has been registered by the menus 10a, 10b within the second period of time as shown at Step 114. If a new usage has not been registered by the menus 10a, 10b within the second period of time, then a new usage has occurred and the usage counter for menus 10a, 10b may be increased as shown at Step 116. If a new usage has been registered by the menus 10a, 10b within the second period of time, then no new usage has occurred as shown at Step 118.

FIG. 4 illustrates a method 300 for determining menu grouping status for menus 10a, 10b. The terminals 106, 107 may determine if the menus 10a, 10b have been idle for a third predetermined period of time (such as, 1 minute, 30 seconds, 20 seconds or 10 seconds) as shown at Step 302. If the menus 10a, 10b have not been idle for the predetermined period of time, then a change in the group status of menus 10a, 10b has not occurred as shown at Step 304. If the menus 10a, 10b have been idle for the third predetermined period of time, then the terminals 106, 107 may determine if the menus 10a, 10b have been in contact with each other (via the third sensor 24 of the menus 10a, 10b) for more than a fourth predetermined period of time (such as, 20 seconds, 10 seconds, 5 seconds or 2 seconds) as shown at Step 306. If the menus 10a, 10b have not been in contact with each other for the forth predetermined period of time, then a change in menu grouping status has occurred as shown at Step 308.

The terminals 106, 107 may determine whether the menus 10a, 10b have been moved together to the same or substantially the same destination position, such as the table 116 based on comparing the acceleration data detected from the sensors 22, 24 of the menus 10a, 10b as shown at Step 307. If the acceleration data for the menus 10a, 10b are the same or substantially similar, the terminals 106, 107 may determine that the menus 10a, 10b may have been moved together or in conjunction with each other and a change in menu grouping status has occurred as shown at Step 309.

If the menus 10a, 10b have not been moved together, then the terminals 106, 107 may determine if the menus 10a, 10b have been in a close proximity to the table 116 (as determined by the second communication means 18 of the menus 10a, 10b and the proximity sensor 108) for more than the fourth predetermined period of time as shown at Step 310. If the terminals 106, 107 determine that the menus 10a, 10b have been in close proximity to the table 116 for more than the fourth predetermined period of time, then a change in the menu grouping status has occurred as shown at Step 312. If the terminals 106, 107 determine that the menus 10a, 10b are not in close proximity to the table 116 for more than the fourth predetermined period of time, then a change in the menu grouping status has not occurred as shown at Step 314.

In embodiments, the systems and methods of the present disclosure may control the updating of the information and/or multimedia data which may be stored in or displayed by the device 12 of the menus 10a, 10b. The terminals 106, 107 of the system 100 may establish a menu status for the menus 10a, 10b to determine whether to perform or not to perform updating of the information and/or multimedia data of the menus 10a, 10b. An inappropriate menu status may be determined when the menus 10a, 10b are in use, are located at the table 116 or are members of a menu grouping. An appropriate menu status may be determined when the menus 10a, 10b are not in use, are idle or are docked to the charging base 114. Updating the information and/or multimedia data may be permitted or performed when the menu status is appropriate. Updating the information and/or multimedia data may be prohibited when the menu status is inappropriate to prevent the employee and/or the provider from modifying the information and/or the multimedia data or the available goods and/or services offered by the provider while the menus 10a, 10b are distributed to the users. For example, the system 100 may be prevented from updating the menu items and/or prices via the terminals 106, 107 or may be prevented from automated modification of menu items and/or prices based on inventory tracking while the menus 10a, 10b are distributed to the users. The system 100 may allow desired types of updating the information and/or multimedia data, such as screen sharing of common menu content between more than one menu associated with each other or with a grouping to display the common menu content.

In embodiments, one or more of the menus 10a, 10b may be updated in real-time to render updated information and/or multimedia data based on a good or service selected by the user of one of the menus 10a, 10b from the available goods and services displayed by the menus 10a, 10b. For example, a user of menu 10a may select a good from the available goods and services displayed by menu 10a. The device 12 of the menu 10a may transmit that information and/or multimedia data for the desired good to the terminals 106, 107 via the first network 104a. The terminals 106, 107 may identify the desired good and store the information and/or multimedia data indicative of the desired good. The terminals 106, 107 may transmit the information and/or multimedia data indicative of the desired good to the menu 10b via the first network 104a. The menu 10b may render and/or display the information and/or multimedia data for the desired good to the user of the menu 10b. In embodiments, the menu 10b may be prevented from render information and/or multimedia data for goods and/or services that have not been selected by the menu 10a.

In embodiments, the system 100 may be capable of updating electronic menus for franchise establishments or multi-site establishments. The system may update the electronic menus at more than one site of franchise or multi-site establishments in an immediate and coordinated fashion by including, highlighting and/or supporting a current promotional item or marketing campaign in such a manner that eliminates the need to print and ship menus for the current promotional item and/or marketing campaign. As a result, a menu content for the electronic menus of franchise or multi-site establishments may be easily customized for regional and other demographic markets via the system 100.

The system 100 may provide an environmental benefit based on saving paper associated with repeated printing of printed menus, and based on saving resources associated with shipping, transporting and packaging printed menus to distribute new or updated printed menus to more than one site of franchise or multi-site establishments.

In embodiments, the menu 10 may be determined to be in use or not in use based on the sensors 20, 22, 24. The menu 10 may be determined to be in use when the first sensor 20 detects that the cover 13 is open or the menu 10 has activated the display 14. In embodiments, the employee may manually activate the menu 10 and designate the menu 10 as in use for a predetermined in-use period of time, such as, for example, 12 minutes, 10 minutes, 5 minutes or 2 minutes. In embodiments, the first menu 10a may be determined to be in use when the first menu 10a is within proximity to the table 116 and/or to the second menu 10b as detected by the second communication means 18 of the menus 10a, 10b and the proximity sensor 108.

In embodiments, the menu 10 may be determined to be in use when the data detected by second sensor 22 indicates that the menu 10 is in motion or being moved by the employee or the user or the data detected by the third sensor 24 indicates that the menu 10 is in contact with or in close proximity to another menu, the employee or the user. In embodiments, if the menu 10 is determined to be in use and/or located at the table 116 for a predetermined in-use period of time, such as 12 minutes, 10 minutes, 5 minutes or 2 minutes, then the usage count of the menu 10 may be increased. In embodiments, the menu 10 may be determined to be in use and located at the table 113 if the menu 113 is currently part of a menu group.

Figure 5:
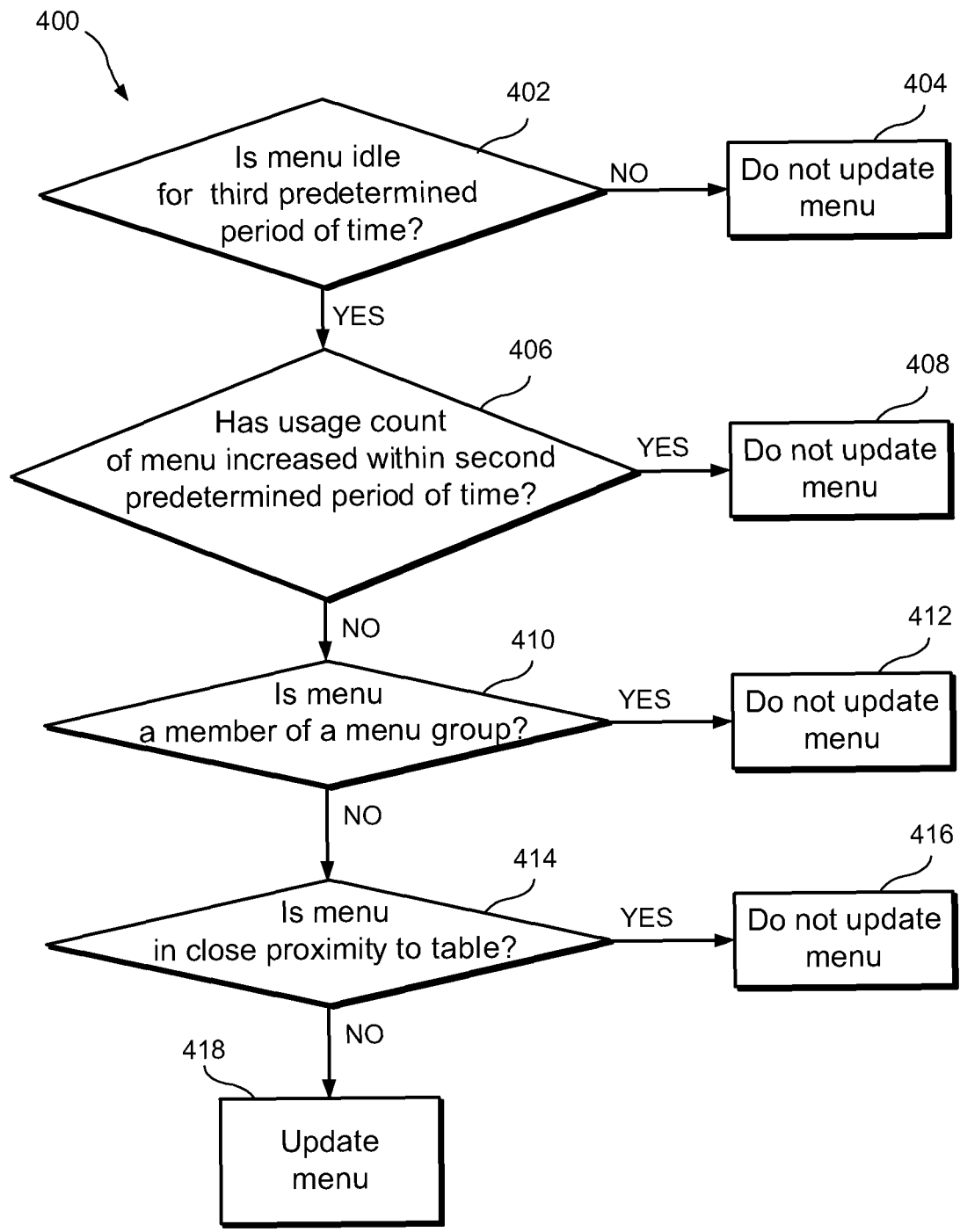
FIG. 5 illustrates a flow chart of a method for updating menu content in accordance with the present disclosure.

FIG. 5 illustrates a method 400 for updating the information and/or multimedia data stored and displayed by the device 12 of the menus 10a, 10b. The terminals 106, 107 may determine if the menus 10a, 10b have been idle at least the third predetermined period of time (i.e., 1 minute, 30 seconds, 20 seconds or 10 seconds) as shown at Step 402. If the terminals 106, 107 determine that the menus 10a, 10b have not be idle for the third predetermined period of time, then the terminals 106, 107 may not update the information and/or multimedia data of the menus 10a, 10b as shown at Step 404. If the terminals 106, 107 determine that the menus 10a, 10b have been idle for at least the fourth predetermined period of time, then the terminals 106, 107 may determine if the usage count for the menus 10a, 10b has been increased within the second predetermined period of time (i.e., 12 minutes, 10 minutes, 5 minutes or 2 minutes) as shown at Step 406.

If the usage count of the menus 10a, 10b has been increased within the second predetermined period of time, then the terminals 106, 107 may not update the information and/or multimedia data of the menus 10a, 10b as shown at Step 408. If the usage count of the menus 10a, 10b has not been increased within the second predetermined period of time, then the terminals 106, 107 may determine if the menus 10a, 10b may be members of a menu group as shown at Step 410. If the terminals 106, 107 determine that the menus 10a, 10b may be members of a menu grouping, then the terminals 106, 107 may not update the information and/or multimedia data of the menus 10a, 10b as shown at Step 412.

If the terminals 106, 107 determine that the menus 10a, 10b are not members of a menu grouping, then the terminals 106, 107 may determine if the menus 10a, 10b are in close proximity to the table 116 (via the second communication means 18 of the device 10a, 10b and the proximity sensor 108) as shown at Step 414. If the menus 10a, 10b may be in close proximity to the table 116, then the terminals 106, 107 may not update the information and/or multimedia data of the menus 10a, 10b as shown at Step 416. If the terminals 106, 107 may determine that the menus 10a, 10b may not be in close proximity to the table 116, then the terminals 106, 107 may update the information and multimedia data of the menus 10a, 10b as shown at Step 418.

In embodiments, the system and method of the present disclosure may dynamically determine a dining room layout for a dining room floor in the establishment or the room of the provider. The system 100 may determine a configuration of dining tables in the room which may match the current menu groups based on the data detected by the sensors 20, 22, 24 of the menu 10 to localize group and seat locations and a set of floor templates.

In embodiments, the systems and methods of the present disclosure may determine a number of tables and a seating configuration for a menu group. In embodiments, the terminals 106, 107 of the system 100 may be programmed with visualization software for determining the number of tables and the seat configuration of the menu grouping. The employee may manually interact with the terminals 106, 107 and the visualization software and/or may determine the number of tables and the seat configuration for the menu group.

In embodiments, the number of tables and the seating configuration for the menu group may be automatically configured by the terminals 106, 107 of the system 100. Layout templates of the dining room layout may be input into the terminals 106, 107 which may be streamlined by inputting a single layout and by designating which tables are movable tables such that the movable tables may be combined with nearby tables to form combined tables.

Figure 7:
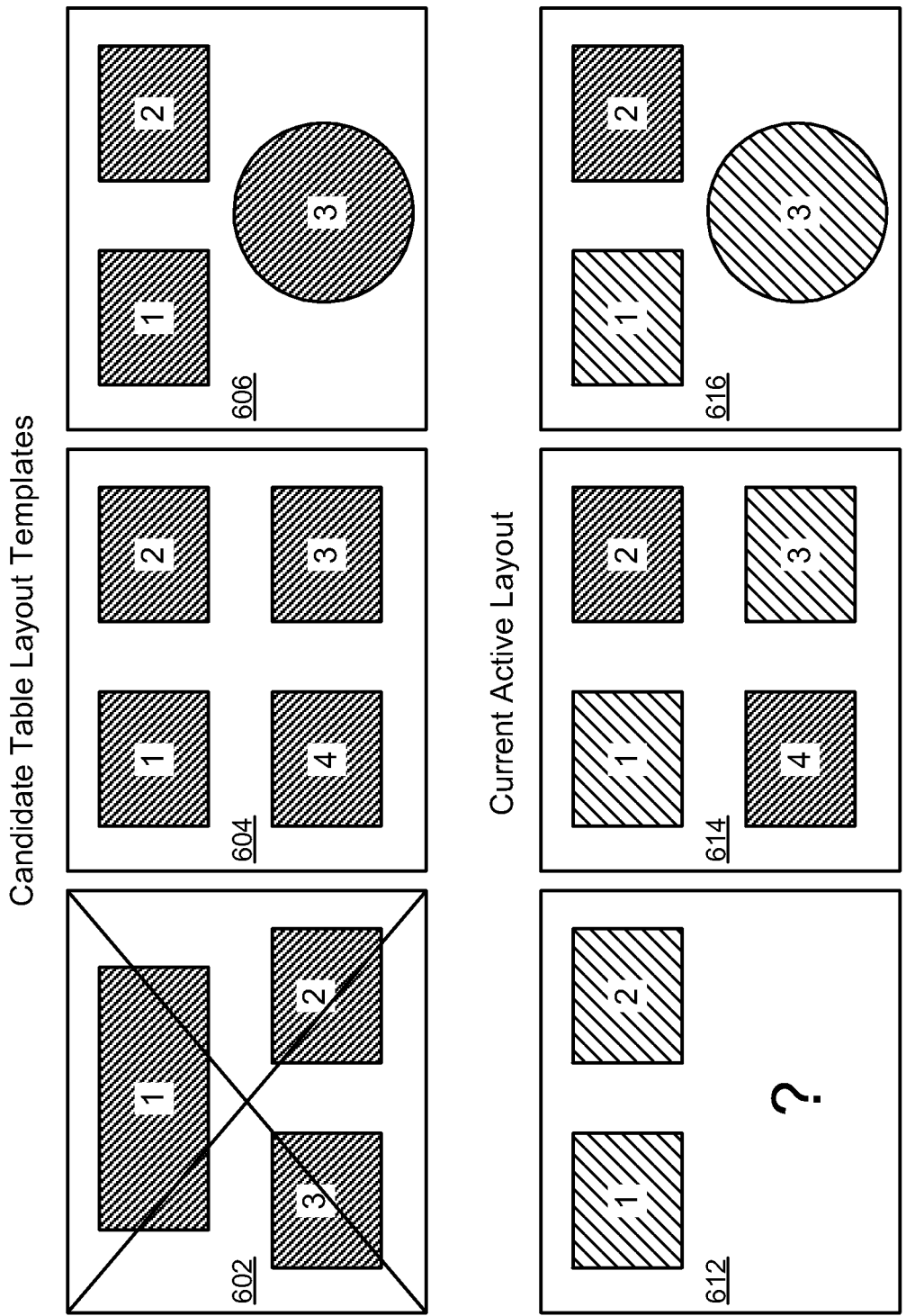
FIG. 7 illustrates a flow chart of a method for mapping and comparing a candidate table layout template with a current active layout in accordance with the present disclosure.

The terminals 106, 107 of the system 100 may maintain a set of candidate templates 602, 604, 606 as shown in FIG. 7 which may be based on information regarding the single layout of the room, the movable tables and/or the combined tables. The candidate templates 602, 604, 606 of the floor plan may be a subset of a full set of templates. The terminals 106, 107 may be programmed with software that includes the candidate templates 602, 604, 606, the subset of templates and/or the full set of templates.

The terminals 106, 107 may maintain an active dining room mapping (hereinafter "active mapping") to determine a current active layout for the dining room. The current active layout may be identified as or matched to a potential active layouts for the dining room. The potential active layouts of the dining room may be a first active layout 612 (hereinafter "layout 612"), a second active layout 614 (hereinafter "layout 614") or a third active layout 616 (hereinafter "layout 616") as shown in FIG. 7. For example, the layouts 612, 614, 616 may represent three different scenarios in which menu grouping of the menus 10*a*, 10*b* are detected in different configuration.

The terminals 106, 107 may identify the menu grouping of the menus 10*a*, 10*b* and the configuration of the menus 10*a*, 10*b* in the menu grouping. The terminals 106, 107 may match one of the candidate templates 602, 604, 606 to the menu grouping of the menus 10*a*, 10*b* and/or to the configuration of the menus 10*a*, 10*b* in the menu grouping to determine the current active layout for the dining room. As a result, the terminals 106, 107 may provide active mapping of the dining room to identify the current active layout based on one of the candidate templates 602, 604, 606 which matches one of the layouts 612, 614, 616.

In embodiments, the terminals 106, 107 may provide the active mapping to determine the active layout of the dining room from one of the layouts 612, 614, 616 based on unique information of the menu group and/or information regarding the current active and occupied tables of the floor plan. The unique information of the menu group may include a number of users in the menu group or a number of tables required for accommodating the users of the menu group. It should be understood that the present disclosure is not limited to a specific embodiment of the unique information of the menu group.

In embodiments, the system 100 may locate groupings within the dining room floor based on the data detected by the second communications means 18 of the menus 10*a*, 10*b* and the proximity sensor 108. The terminals 106, 107 may determine the coordinates of a center of the menu grouping to identify a center table that may be located adjacent to the center of menu grouping. The terminals 106, 107 may associate the menu grouping with the center table on the floor template such that a distance between the center table and the center of the menu grouping is minimized.

In embodiments, the systems and method of the present disclosure may update a candidate template list when one or more menu groupings may be added or deleted. Additionally, the terminals 106, 107 may prompt the employee to confirm or reject an automatically updated table configuration to resolve and/or to prevent ambiguities on the current active layout for the dining room.

Figure 6:
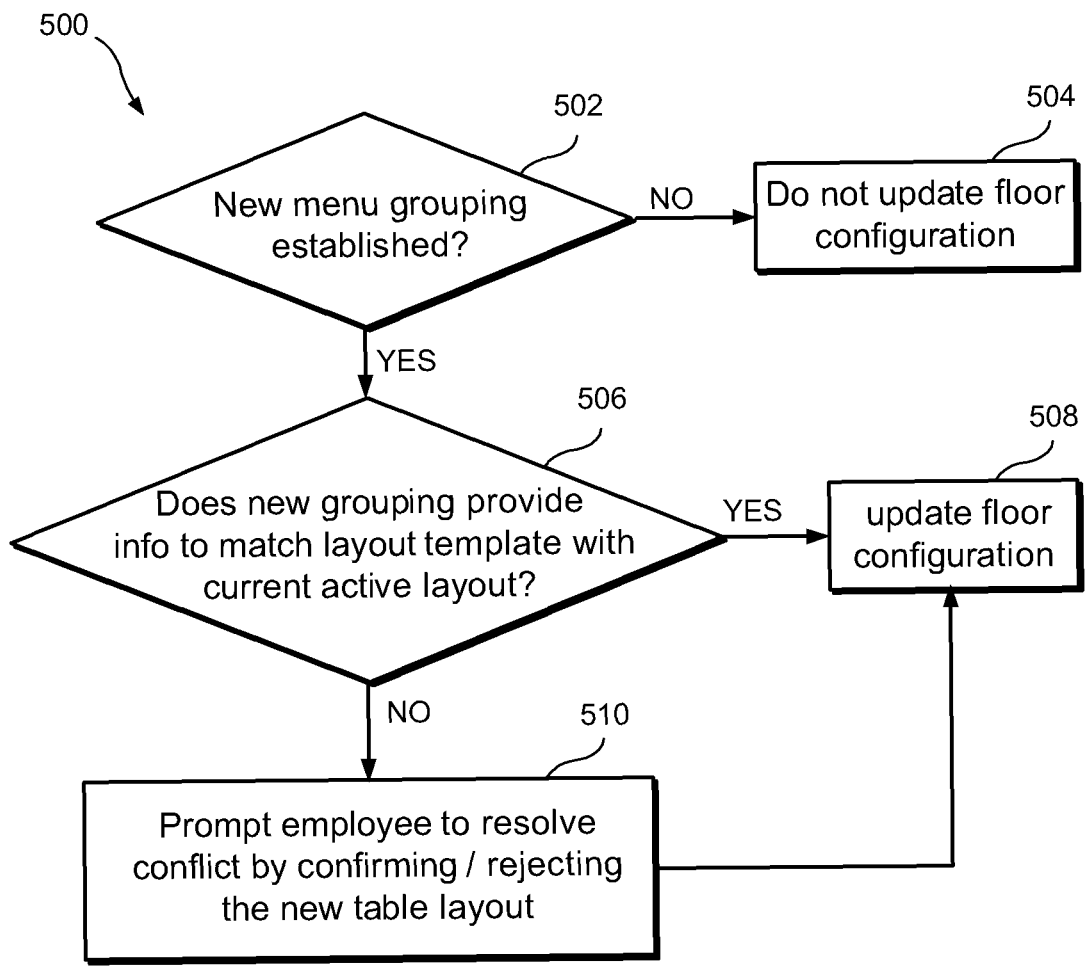
FIG. 6 illustrates a flow chart of a method for mapping a floor configuration of a room in accordance with the present disclosure.

FIG. 6 illustrates a method 500 for mapping a floor configuration of the dining room layout such that one or more tables may be added, eliminated and/or reconfigured. The terminals 106, 107 may determine if a new menu grouping has been established as shown at Step 502. If the terminals 106, 107 determine that no new menu grouping has been established, then the floor configuration is not mapped as shown at Step 504.

If the terminals 106, 107 determine that a new menu grouping has been established, then the terminals 106, 107 may determine if the new menu grouping provides information to match one of the candidate layout templates 602, 604, 606 with one of the current active layouts 612, 614, 616 determined by the terminals 106, 107 as shown at Step 506. If the new menu grouping provides information to match one of the candidate layout templates 602, 604, 606 with one of the current active layouts 612, 614, 616, then the floor configuration may be updated to add a table for the new menu grouping as shown at Step 508 and in FIG. 7, If the terminals 106, 107 determine that the new menu grouping does not provide information to match one of the candidate layout templates 602, 604, 606 with one of the current active layouts 612, 614, 616, then the terminals 106, 107 may prompt the employee to resolve the conflict by confirming or rejecting a suggested updated floor configuration based on one of the candidate layout templates 602, 604, 606 which may be suggested by the terminals 106, 107 as shown at Step 510.

The employee may reject one of the candidate layout templates 602, 604, 606 that may be suggested and displayed by the terminals 106, 107, and the terminals 106, 107 may suggest another one of the candidate layout templates 602, 604, 606 as an alternative. The employee may confirm that the one of the candidate layout templates 602, 604, 606 suggested by the terminals 106, 107 or the alternative suggested by the terminals 106, 107 may be desirable and/or acceptable. As a result, the terminals 106, 107 may update the current active layout to define a new table layout or floor configuration for the dining room to add the table for the new menu grouping as shown at Step 508. Alternatively, the terminals 106, 107 may select the suggested updated floor configuration based on one of the candidate table layout templates 602, 604, 606 stored within the terminals 106, 107 if the new menu grouping provides information to match one of the candidate table layout templates 602, 604, 606 to one of the current active layouts 612, 614, 616.

For example, the terminals 106, 107 may display that the current active layout 612 as shown in FIG. 7 which may illustrate that tables 1 and 2 are currently active and occupied and that the new menu grouping does not provide information (represented by the question mark in current active layout 612) to match the current active layout 612 to one of the candidate layout templates stored in the terminals 106, 107. Accordingly, the terminals 106, 107 may not display a candidate table layout template that matches the current active layout 612 or the terminals 106, 107 may suggest the candidate table layout template 602 which may be crossed-out until the employee confirms that candidate table layout template 602 may match or may be in accordance with current active layout 612.

FIG. 7 illustrates that a current active mapping may not be fully determined at all times. However, an algorithm included in software of the terminals 106, 107 may continue to eliminate candidate layout templates from the subset or the set of candidates layout templates as the terminals 106, 107 may gain information and/or data associated with the menus 10*a*, 10*b*.

FIG. 7 illustrates three possible candidate layout templates 602, 604, 606. Active layouts 612, 614, and 616 may represent possible future states of the active mapping, after a new table may become occupied. For example, a menu grouping may have been previously established at table 1, so candidate layout template 602 may be eliminated from the set of available candidate templates. Thus, there may be three possible cases: (a) the next table to be occupied may be table 2, and table 2 may become active in the active mapping, but without further information, the terminals 106, 107 may not be able to determine which remaining candidate layout template may be correct; (b) table 3 (or table 4) may become occupied, table 3 (or table 4) may become active in the current active mapping and the terminals 106, 107 may determine that the candidate layout template 604 may be the current active layout for the dining room, or (c) table 3 may become occupied, table 3 may become active in the current active mapping and the terminals 106, 107 may determine that candidate layout template 606 may be the current active layout for the dining room.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A system for displaying and managing wireless electronic menus comprising:
    a computer terminal connected to a wireless communication network; and
    a first electronic menu having a first display, a first memory, a first wireless transducer and a first sensor connected to a first microprocessor, wherein the first wireless transducer is configured to wirelessly connected to the wireless communication network such that the first electronic menu wirelessly communicates with the computer terminal over the wireless communication network,
    a second electronic menu having a second display, a second memory, a second wireless transducer and a second, sensor connected to a second microprocessor, wherein the second wireless transducer of the second electronic menu is configured to wirelessly connected to the wireless communication network such that the second electronic menu wirelessly communicates with the computer terminal over the wireless communication network,
    a proximity sensor connected to the wireless communication network, Wherein the proximity sensor is configured to wirelessy detect a first dectected location of the First electronic menu and a second detected location of the second electronic menu, and
    a wireless electronic menu grouping comprising the first and second electronic menus, wherein the wireless electronic menu grouping is based on the first and second detected location of the first and second electronic menus or data associated with the first and second electronic menus and collected by the sensors of the first and second electronic menus.

2. The system according to claim 1 further comprising:
    a third wireless transducer connected to the first microprocessor of the first electronic menu or the second electronic menu, wherein the third wireless transducer is configured to wirelessly communicate with the proximity sensor.

3. The system according to claim 1, wherein
    the first sensor of the first electronic menu is configured to detect movements of the first electronic menu.

4. The system according to claim 1
    wherein the first sensor of the first electronic menu is configured to detect activation or deactivation of the first electronic menu, wherein the first sensor of the first electronic menu is a touch sensor, a thermal sensor, or a pressure sensor.

5. The system according to claim 1, wherein the first sensor of the first electronic menu is selected from the group consisting of a plunger, a photo-sensor, an optical sensor, an infrared sensor, a level sensor, a gyroscope sensor, a microphone, a photoelectric sensor, a photoswitch, an inclinometer, an infrared thermometer, and an accelerometer.

6. The system according to claim 1 further comprising:
    means for determining a configuration of a table based on the detected locations of the first and second electronic menus.

7. The system according to claim 1, wherein the first and second electronic menus are configured to render
    advertising media or information regarding one or more goods or services.

8. A method for displaying and managing electronic menus, the method comprising:
    connecting a computer terminal, a first electronic menu and a second electronic menu to a wireless communication network, wherein the first electronic menu comprises a first display, a first memory, a first wireless transducer and a first sensor connected to a first microprocessor, wherein the first wireless transducer is configured to wirelessly connect to the wireless communication network, wherein the second electronic menu comprises a second display, a second memory, a second wireless transducer and a second sensor connected to a second microprocessor, wherein the second wireless transducer is configured to wirelessly connected to the wireless communication network;
    detecting a first detected location of the first electronic menu and a second detected location of the second electronic menu, wherein the first and second locations are wirelessly detected by a proximity sensor connected to the first communication network; and
    grouping the first and second electronic menus together to form a wireless electronic menu grouping based on the first and second detected locations of the first and second electronic menus.

9. The method according to claim 8, further comprising:
    determining a table configuration of a table based on the first and second detected locations of the first and second electronic menus.

10. The method according to claim 8, further comprising:
    identifying information indicative of the wireless electronic menu grouping, wherein a floor configuration of a floor is updated if the information indicative of the wireless electronic menu grouping provides a current active layout of the floor that matches a layout template of the floor.

11. The method according to claim 8, further comprising:
    tracking usage of the first electronic menu via the first sensor of the first electronic menu or the proximity sensor.

12. The method according to claim 11, further comprising:
    determining whether the first electronic menu or second electronic menu is in an updatable state.

13. The method according to claim 8, further comprising:
    providing common menu information to each wireless electronic menu of the wireless electronic menu grouping.

14. The method according to claim 8, further comprising:
    rendering advertising media via the first electronic menu or the second electronic menu.

15. The method according to claim 8, further comprising:
    updating the first electronic menu if the first electronic menu is in an updatable state, wherein the first electronic menu is not updatable if the first electronic menu is a member of the wireless electronic menu grouping or the first electronic menu is not be updatable if the first electronic menu is associated with a table and the second electronic menu.

16. The method according to claim 8, further comprising:
determining if a new wireless electronic menu grouping is established by the first and second electronic menus based on proximity of the first electronic menu with respect to a table or the second electronic menu, wherein a floor configuration of a floor is not updated if the new wireless electronic menu grouping is not established.

17. A method for displaying and managing electronic menus, the method comprising:
connecting a first electronic menu and a second electronic menu to a wireless communication network, wherein the first electronic menu comprises a first display, a first memory, a first wireless transducer and a first sensor connected to a first microprocessor, wherein the first electronic menu is configured to render advertising media via the first display, wherein the first wireless transducer wirelessly connects to the wireless communication network, wherein the second electronic menu comprises a second display, a second memory, a second wireless transducer and a second sensor connected to a second microprocessor, wherein the second electronic menu is configured to render information, multimedia data or advertising media via the second display, wherein the second wireless transducer wirelessly connects to the wireless communication network;
detecting a first detected location of the first electronic menu and a second detected location of the second electronic menu, wherein the detected locations are wirelessly detected by a proximity sensor connected to the first communication network; and
grouping the first and second electronic menus together to form a wireless electronic menu grouping based on the first and second detected locations of the first and second electronic menus and a table in close proximity of the first and second electronic menus.

18. The method according to claim 17, further comprising:
providing common menu information to each electronic menus of the wireless electronic menu grouping, wherein the common menu information is indicative of at least one user of the first electronic menu or the second electronic menu.

19. The method according to claim 17, further comprising:
determining a table configuration of a table based on the first and second detected locations of the first and second electronic menus.

20. The method according to claim 17, further comprising:
identifying information indicative of the wireless electronic menu grouping, wherein a floor configuration of a floor is updated if the information indicative of the wireless electronic menu grouping provides a current active layout of the floor that matches a layout template of the floor.

* * * * *